US012166557B2

(12) United States Patent
Katla et al.

(10) Patent No.: US 12,166,557 B2
(45) Date of Patent: Dec. 10, 2024

(54) DEEP LEARNING AIDED FINGERPRINT BASED BEAM ALIGNMENT

(71) Applicant: InterDigital Patent Holdings, Inc., Wilmington, DE (US)

(72) Inventors: Satyanarayana Katla, London (GB); Mohammed El-Hajjar, Southampton (GB); Alain Mourad, Staines-Upon-Thames (GB)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 364 days.

(21) Appl. No.: 17/638,317

(22) PCT Filed: Aug. 28, 2020

(86) PCT No.: PCT/US2020/048475
§ 371 (c)(1),
(2) Date: Feb. 25, 2022

(87) PCT Pub. No.: WO2021/041859
PCT Pub. Date: Mar. 4, 2021

(65) Prior Publication Data
US 2022/0321192 A1 Oct. 6, 2022

Related U.S. Application Data

(60) Provisional application No. 62/894,666, filed on Aug. 30, 2019.

(51) Int. Cl.
*H04B 7/06* (2006.01)
*G06N 3/048* (2023.01)
*G06N 3/084* (2023.01)

(52) U.S. Cl.
CPC .......... *H04B 7/0695* (2013.01); *G06N 3/048* (2023.01); *G06N 3/084* (2013.01)

(58) Field of Classification Search
None
See application file for complete search history.

(56) References Cited

U.S. PATENT DOCUMENTS 10,530,451 B1 * 1/2020 Bansal ............... H04W 4/40
2019/0253900 A1 * 8/2019 Narasimha ........... H04W 4/025
(Continued)

FOREIGN PATENT DOCUMENTS

| CN | 108226862 A | 6/2018 |
| CN | 110736963 A | 1/2020 |

(Continued)

OTHER PUBLICATIONS

Capone et al, "Obstacle Avoidance Cell Discovery using mm-waves Directive Antennas in 5G Networks", Institute of Electrical and Electronics Engineers (IEEE), 2015 IEEE 26th Annual International Symposium on Personal, Indoor, and Mobile Radio Communications (PIMRC), Hong Kong, China, Aug. 30, 2015, 5 pages.
(Continued)

*Primary Examiner* — Christopher T Wyllie
(74) *Attorney, Agent, or Firm* — VOLPE KOENIG

(57) ABSTRACT

Some embodiments of a method may include: obtaining input data comprising a user equipment location, a number of user equipments, and a desired receive signal strength; processing the input data with a neural network having weights determined from a training phase to generate a set of one or more beam-pair indices; performing a beam search over at least a subset of the set of beam-pair indices; and receiving at least one beam-pair index from a vehicle that provides a desired received signal strength.

18 Claims, 24 Drawing Sheets

(56) References Cited

U.S. PATENT DOCUMENTS

| | | | |
|---|---|---|---|
| 2020/0169311 A1* | 5/2020 | Ottersten | H04B 7/0695 |
| 2020/0275402 A1* | 8/2020 | Shi | H04W 76/11 |
| 2020/0396710 A1* | 12/2020 | Wigren | H04W 24/10 |
| 2021/0258063 A1* | 8/2021 | Ottersten | H04W 24/10 |
| 2021/0391911 A1* | 12/2021 | Hoydis | H04B 7/0695 |
| 2022/0321192 A1* | 10/2022 | Katla | G06N 3/084 |

FOREIGN PATENT DOCUMENTS

| | | |
|---|---|---|
| EP | 3420742 B1 | 12/2019 |
| WO | WO 2019004885 A1 | 1/2019 |
| WO | WO 2019133049 A1 | 7/2019 |

OTHER PUBLICATIONS

Va et al., "Inverse Multipath Fingerprinting for Millimeter Wave V2I Beam Alignment", Institute of Electrical and Electronics Engineers (IEEE), IEEE Transactions on Vehicular Technology, vol. 67, No. 5, May 2018, 17 pages.

Satyanarayana et al., "Dual-Function Hybrid Beamforming and Transmit Diversity Aided Millimeter Wave Architecture", Institute of Electrical and Electronics Engineers (IEEE), IEEE Transactions on Vehicular Technology, vol. 67, No. 3, Mar. 2018, 6 pages.

Aviles et al, "Position-aided mm-wave beam training under NLOS conditions", Institute of Electrical and Electronics Engineers (IEEE), IEEE Access, vol. 4, Nov. 21, 2016, 12 pages.

El Ashry et al., "Wi-Fi based indoor localization using trilateration and fingerprinting methods", IOP Conference Series: Materials Science and Engineering, 18th International Conference on Aerospace Sciences & Aviation Technology, vol. 610, 2019, 21 pages.

Hur et al., "Millimeter Wave Beamforming for Wireless Backhaul and Access in Small Cell Networks", Institute of Electrical and Electronics Engineers (IEEE), IEEE Transactions on Communications, vol. 61, No. 10, Oct. 2013, 13 pages.

Capone et al., "Context Information for Fast Cell Discovery in mm-wave 5G Networks", Proceedings of European Wireless 2015, 21th European Wireless Conference, Budapest, Hungary, May 20, 2015, 6 pages.

Zhao, Bobai, et. al., "Convolutional neural network and dual-factor enhanced variational Bayes adaptive Kalman filter based indoor localization with Wi-Fi", Elsevier B.V., Science Direct, Computer Networks, vol. 162, Jul. 17, 2019, 16 pages.

Hemadeh et al., "Millimeter-Wave Communications: Physical Channel Models, Design Considerations, Antenna Constructions, and Link-Budget", Institute of Electrical and Electronics Engineers (IEEE), IEEE Communications Surveys and Tutorials, vol. 20, No. 2, Secondquarter 2018, Dec. 12, 2017, 44 pages.

English Translation for CN110736963A, entitled: "CSI-based indoor Wi-Fi posioning method and device, and storage medium", Publication date Jan. 31, 2020.

Satyanarayana, et al., "Deep Learning Aided Fingerprint Based Beam Alignment for mmWave Vehicular Communication", Institute of Electrical and Electronics Engineers (IEEE), IEEE Transactions on Vehicular Technology, vol. 68, Issue 11, Nov. 2019, 14 pages.

Bishop, Christopher M., "Pattern Recognition and Machine Learning", Springer Science and Business Media, Microsoft Research Ltd., Feb. 2006, 758 pages.

Chen et al., "Confi: Convolutional Neural Networks Based Indoor Wi-Fi Localization Using Channel State Information", Institute of Electrical and Electronics Engineers (IEEE), IEEE Access, vol. 5, Sep. 7, 2017, 9 pages.

Zhang et al., "Codebook Design for Beam Alignment in Millimeter Wave Communication Systems", Institute of Electrical and Electronics Engineers (IEEE), IEEE Transactions on Communications, vol. 65, No. 11, Nov. 2017, 16 pages.

Wang et al., "CSI-Based Fingerprinting for Indoor Localization: A Deep Learning Approach", Institute of Electrical and Electronics Engineers (IEEE), IEEE Transactions on Vehicular Technology, vol. 66, No. 1, Jan. 2017, 14 pages.

Li et al., "CRLB-based Positioning Performance of Indoor Hybrid AoA/RSS/ToF Localization", Institute of Electrical and Electronics Engineers (IEEE), 2019 International Conference on Indoor Positioning and Indoor Navigation (IPIN), Sep. 30, Pisa, Italy, 6 pages.

Liu et al., "Low Complexity Cooperative Positioning in Multipath Environment", Institute of Electrical and Electronics Engineers (IEEE), 2018 IEEE/CIC International Conference on Communications in China (ICCC), Beijing, China, Aug. 16, 2018, 6 pages.

Dai, Peng, et. al., "Combination of DNN and Improved KNN for Indoor Location Fingerprinting"; Hindawi, Wireless Communications and Mobile Computing, vol. 2019, Article ID 4283857, Available at: https://doi.org/10.1155/2019/4283857, 9 pages.

Wang et al., "Beam Codebook Based Beamforming Protocol for Multi-Gbps Millimeter-Wave WPAN Systems", Institute of Electrical and Electronics Engineers (IEEE), IEEE Journal on Selected Areas in Communications, vol. 27, No. 8, Oct. 2009, 10 pages.

English Translation for CN108226862A, entitled: "A kind of portable equipment, beacon and navigation system", Publication date Jun. 29, 2018.

* cited by examiner

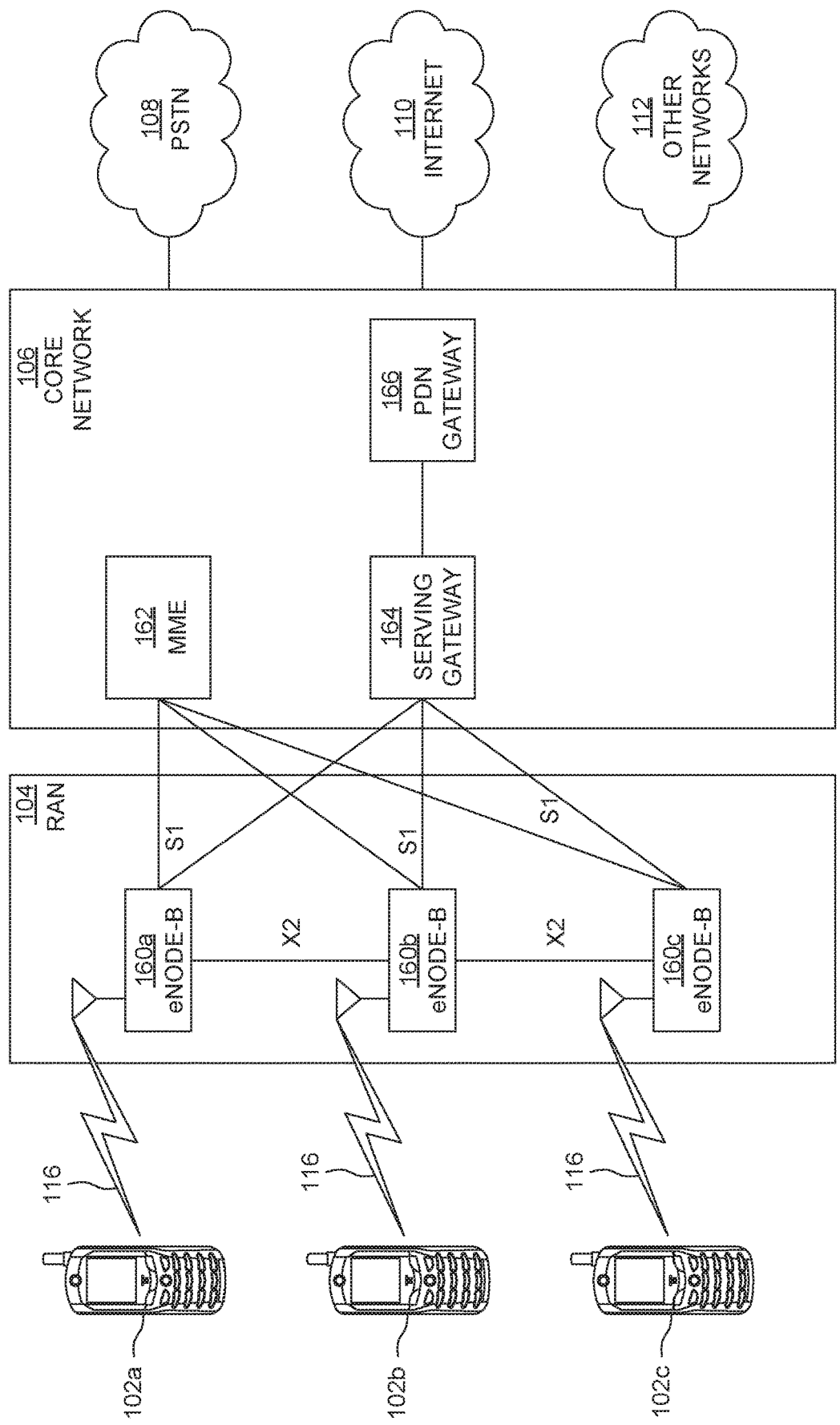

DEEP LEARNING AIDED FINGERPRINT BASED BEAM ALIGNMENT

CROSS REFERENCE TO RELATED APPLICATIONS

This application is a U.S. National Stage Application under 35 U.S.C. 371 of International Patent Application No. PCT/US2020/048475, filed Aug. 28, 2020, which is incorporated herein by reference in its entirety.

This application claims the benefit of U.S. Patent Application No. 62/894,666, filed Aug. 30, 2019, which is incorporated herein by reference in its entirety.

BACKGROUND

Due to the high propagation losses observed at mmWave frequencies, directional transmission is used. Because of the narrow beams and high susceptibility of mmWave frequencies to blockages, aligning the beams for departure and arrival may be challenging.

Establishing good beam-alignment uses the knowledge of both the angle-of-arrival (AoA) and the angle-of-departure (AoD). The AoA-AoD pair may be determined as part of channel estimation. However, performing channel estimation prior to beam-alignment fails to use the beamforming gain, which is used to enable reliable communication over mmWave links. Hence, to circumvent this problem, conventional beam-alignment is performed using exhaustive beam sweeping, in which the base station and the user terminal perform beam searching in all beam directions, for all 360°×360° beam-pairs. This exhaustive search over all beam-pairs may impose significant overhead due to the search complexity for selecting the desired beam direction. To reduce the full-scale search involved in the beam sweeping, hierarchical beam-alignment has been proposed. Many such techniques rely on multi-resolution codebooks that are used at different levels. Such techniques, which are reminiscent of a binary search algorithm, may perform a beam search over a low-level codebook associated with wider beams, and perform another beam search over a high-level codebook which is a subset of the wide beam selected from the lower level codebook. Unfortunately, many hierarchical codebook-based beam-alignment techniques do not reduce the search complexity significantly. Other works that aim to reduce the search complexity often involve optimization techniques. However, these methods may be beneficial only when the objective function exhibits smoothness. These techniques may work well only for objective functions which have no local optimum.

To reduce the overhead and search complexity involved in beam-alignment, blind beam steering relying on accurate location information was proposed. A technique was proposed for inferring the line-of-sight (LOS) direction between the communicating devices. Furthermore, a beam switching strategy was proposed by invoking the classic gradient descent method to maximize the rate under the assumption that the channel always exhibits a single dominant LOS path. However, these methods may not be feasible in practice when the LOS path ceases to exist, which is often the case during heavy traffic, in which the dominant LOS path is blocked by obstacles.

SUMMARY

An example method in accordance with some embodiments may include: obtaining input data comprising a user equipment location, a number of user equipments (UEs), and a desired receive signal strength; processing the input data with a neural network having weights determined from a training phase to generate a set of one or more beam-pair indices; performing a beam search over at least a subset of the set of beam-pair indices; and receiving at least one beam-pair index from a user equipment that provides the desired received signal strength.

For some embodiments of the example method, the user equipment location may be conveyed to a base station from a user equipment using an out of band signaling channel.

For some embodiments of the example method, the number of UEs may be known to a base station according to a vehicular density.

For some embodiments of the example method, the set of one or more beam-pair indices may be further generated using a softmax algorithm.

For some embodiments of the example method, the softmax algorithm may generate probabilities associated with sets of beam-pair indices.

For some embodiments of the example method, the set of one or more beam-pair indices may be stored in a database during a training phase.

For some embodiments of the example method, the training phase may include: obtaining training samples for each training location; initializing weight vectors as random values; and iteratively performing the following steps until a convergence metric threshold is reached: computing neuron outputs for each layer using the respective weight vector; applying a softmax function to obtain class probabilities; calculating weight matrices and bias vectors; and performing error backpropagation.

For some embodiments of the example method, processing the input data with the neural network may include: obtaining a plurality of fingerprints for different traffic conditions at the user equipment location; and using the neural network coupled with a softmax classifier to select one of the plurality of fingerprints based on traffic conditions at the user equipment location, wherein selecting one of the plurality of fingerprints may generate the set of one of more beam-pair indices, and using the neural network may use the weights determined from the training phase.

For some embodiments of the example method, the traffic conditions may include the number of UEs at the user equipment location.

For some embodiments of the example method, the neural network may be a deep learning feedforward neural network.

For some embodiments of the example method, performing the beam search may include: sending, to the user equipment, fingerprint information comprising the set of one or more beam-pair indices; and performing a beam training process over at least the subset of the set of beam-pair indices to select from the set of one or more beam-pair indices a selected beam-pair which meets the desired receive signal strength.

Some embodiments of the example method may further include: obtaining training samples for at least one training location; initializing weight vectors as random values; and iteratively performing the following steps until a convergence metric threshold is reached: computing neuron outputs for at least one layer of the neural network using the respective weight vector; applying a softmax function to an output layer of the neural network to obtain class probabilities; updating weight matrices and bias vectors; and performing error backpropagation.

Some embodiments of the example method may further include determining a loss function between a predicted class probability and a true class probability, wherein the convergence metric threshold is reached if the loss function is less than the convergence metric threshold.

Some embodiments of the example method may further include selecting at least one beam-pair index from the set of beam-pair indices to use to transmit data to a receiver.

For some embodiments of the example method, selecting the at least one beam-pair index may include using a multi-functional beam transmission scheme.

For some embodiments of the example method, selecting the at least one beam-pair index may be repeated periodically.

For some embodiments of the example method, selecting the at least one beam-pair index may be performed upon a triggering event, and the triggering event may be detecting a change in a parameter of the user equipment.

An example apparatus in accordance with some embodiments may include: a processor; and a non-transitory computer-readable medium storing instructions operative, when executed by the processor, to perform any one of the embodiments of the example method.

An additional example method in accordance with some embodiments may include: obtaining location information from a user equipment based on an initial network access process; using a neural network to process the location information to generate a fingerprint output having an associated set of beam-pairs; and conducting beam training using the set of beam-pairs.

Some embodiments of the additional example method may further include informing a user equipment of candidate beam-pairs based on the set of beam-pairs.

For some embodiments of the additional example method, the candidate beam-pairs may be a subset of the associated beam-pairs.

An additional example apparatus in accordance with some embodiments may include a processor; and a non-transitory computer-readable medium storing instructions operative, when executed by the processor, to perform any one of the embodiments of the additional example method.

A further example method in accordance with some embodiments may include: adapting, at a base station, location-specific beam-pair fingerprints to a traffic condition; and using the beam-pair fingerprints to conduct beam training.

A further example apparatus in accordance with some embodiments may include: a processor; and a non-transitory computer-readable medium storing instructions operative, when executed by the processor, to: adapt, at a base station, location-specific beam-pair fingerprints to a traffic condition; and use the beam-pair fingerprints to conduct beam training.

A further additional example method in accordance with some embodiments may include: obtaining input data comprising a user equipment (UE) location, a traffic density of UEs, and received signal strength (RSS) threshold; processing the information for the user equipment with a neural network having weights determined from a training phase to generate a set of one or more beam-pair indices; communicating to the user equipment the set of one or more beam-pair indices; communicating to the user equipment an indication to conduct beam training using the set of one or more beam-pair indices; and receiving at least one beam-pair index from the user equipment that meets the RSS threshold.

A further additional example apparatus in accordance with some embodiments may include: a processor; and a non-transitory computer-readable medium storing instructions operative, when executed by the processor, to: obtain input data comprising a user equipment (UE) location, a traffic density of UEs, and received signal strength (RSS) threshold; process the information for the user equipment with a neural network having weights determined from a training phase to generate a set of one or more beam-pair indices; communicate to the user equipment the set of one or more beam-pair indices; communicate to the user equipment an indication to conduct beam training using the set of one or more beam-pair indices; and receive at least one beam-pair index from the user equipment that meets the RSS threshold.

BRIEF DESCRIPTION OF THE DRAWINGS

FIG. 10 is a graph illustrating example distribution of users at four locations according to some embodiments.

The entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—may only properly be read as being constructively preceded by a clause such as "In at least one embodiment, . . . " For brevity and clarity of presentation, this implied leading clause is not repeated ad nauseum in the detailed description.

Example Networks for Implementation of the Embodiments

A wireless transmit/receive unit (WTRU) may be used, e.g., as a handset, smartphone, mobile device, or user equipment (UE) device (which may be indicated as a user), in some embodiments described herein.

Figure 1A:
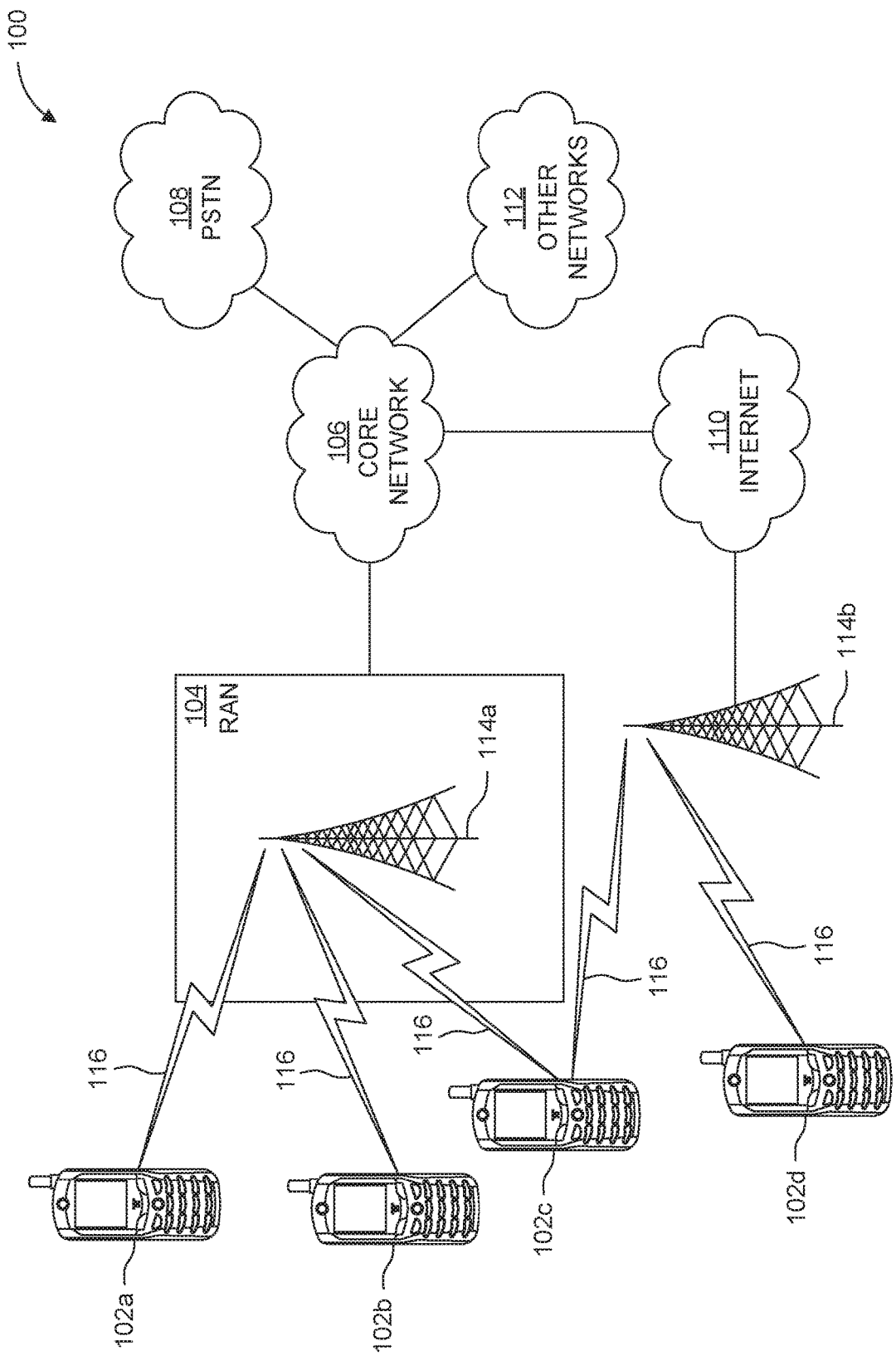
FIG. 1A is a system diagram illustrating an example communications system according to some embodiments.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi)), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104/113 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106 may be in direct or indirect communication with other RANs that employ the same RAT as the RAN 104/113 or a different RAT. For example, in addition to being connected to the RAN 104/113, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
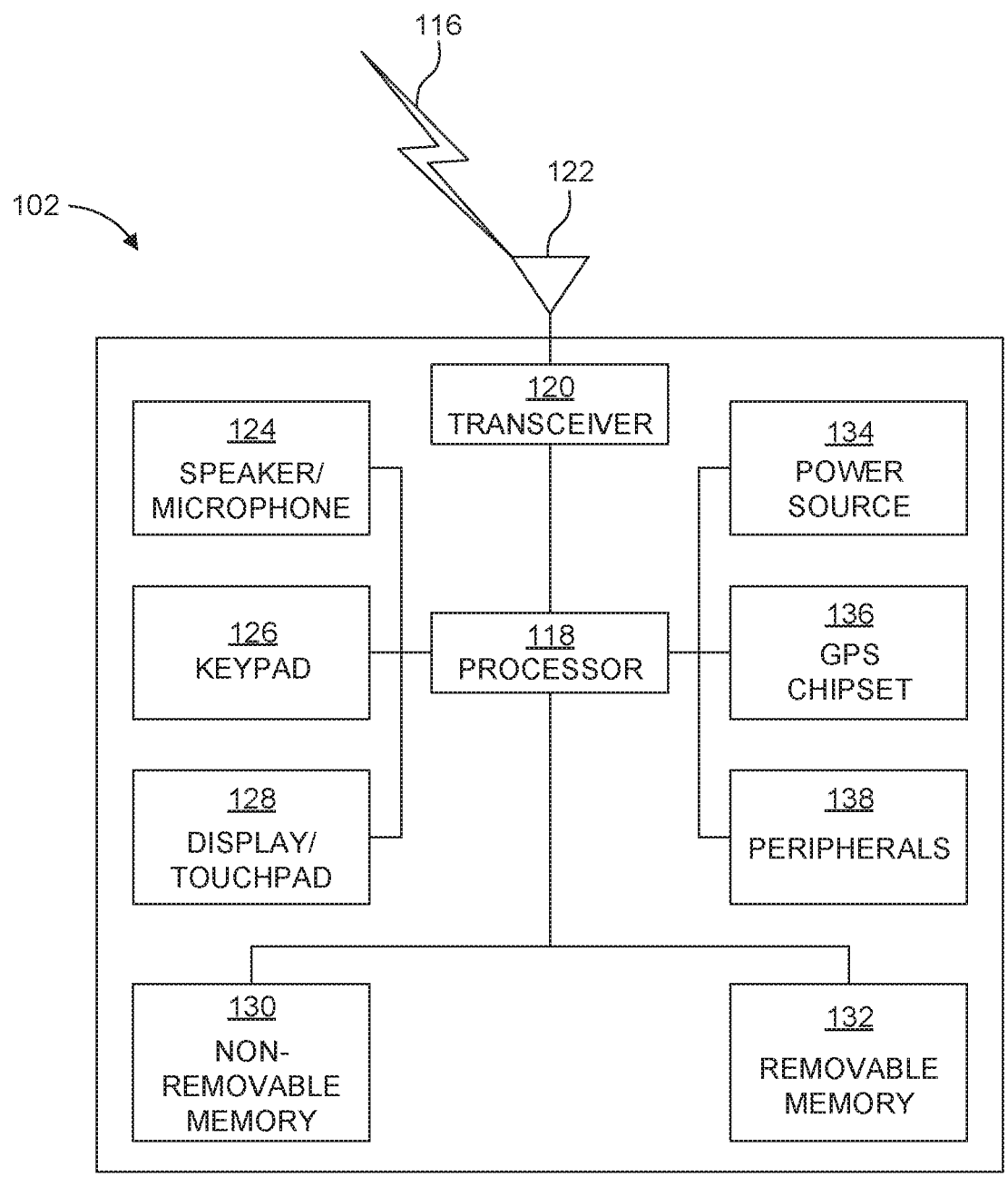
FIG. 1B is a system diagram illustrating an example wireless transmit/receive unit (WTRU) that may be used within the communications system illustrated in FIG. 1A according to some embodiments.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 10:
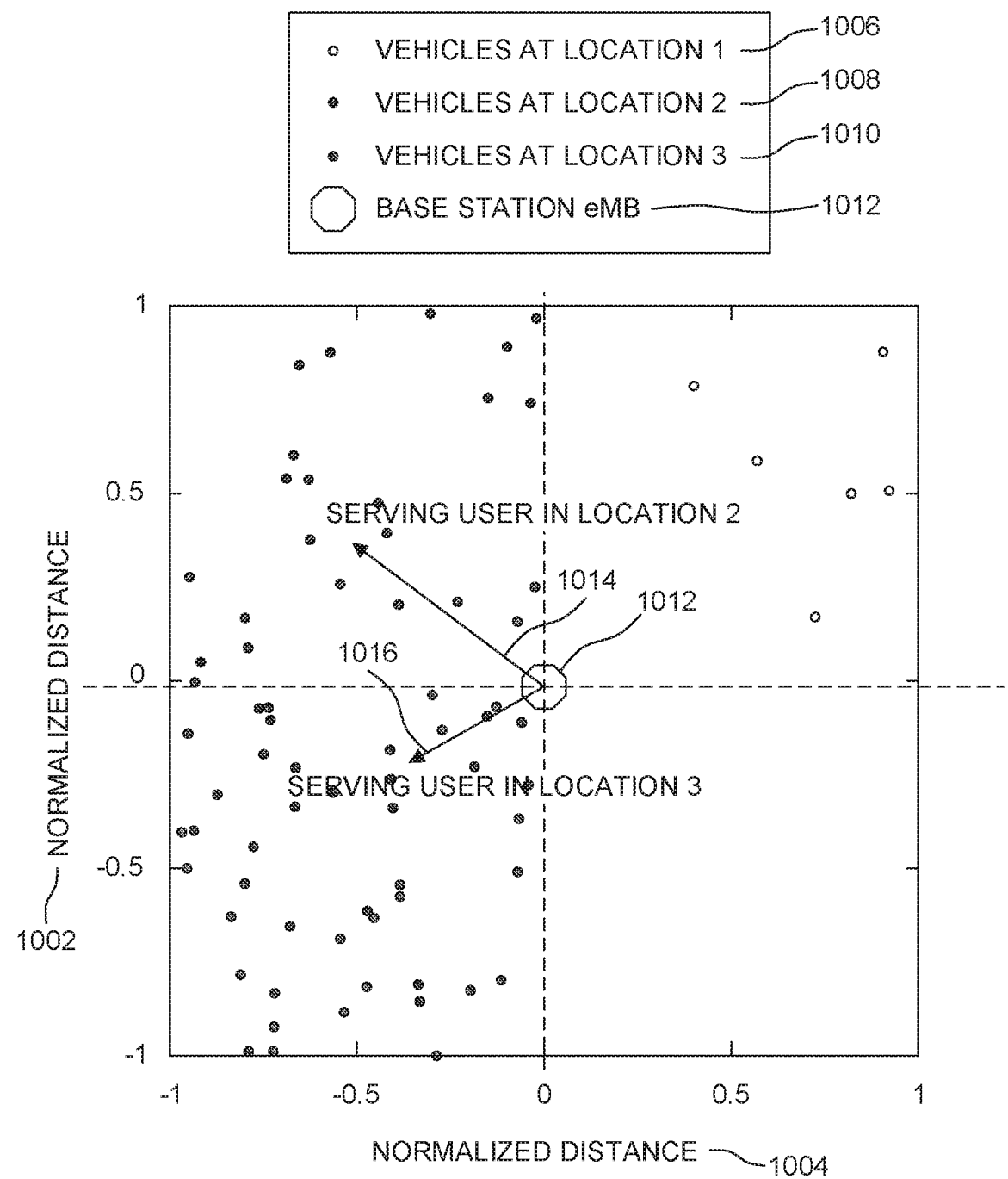
FIG. 10 is a system diagram of an example system illustrating an example radio access network (RAN) and an example core network (CN) that may be used within the communications system illustrated in FIG. 1A according to some embodiments.

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
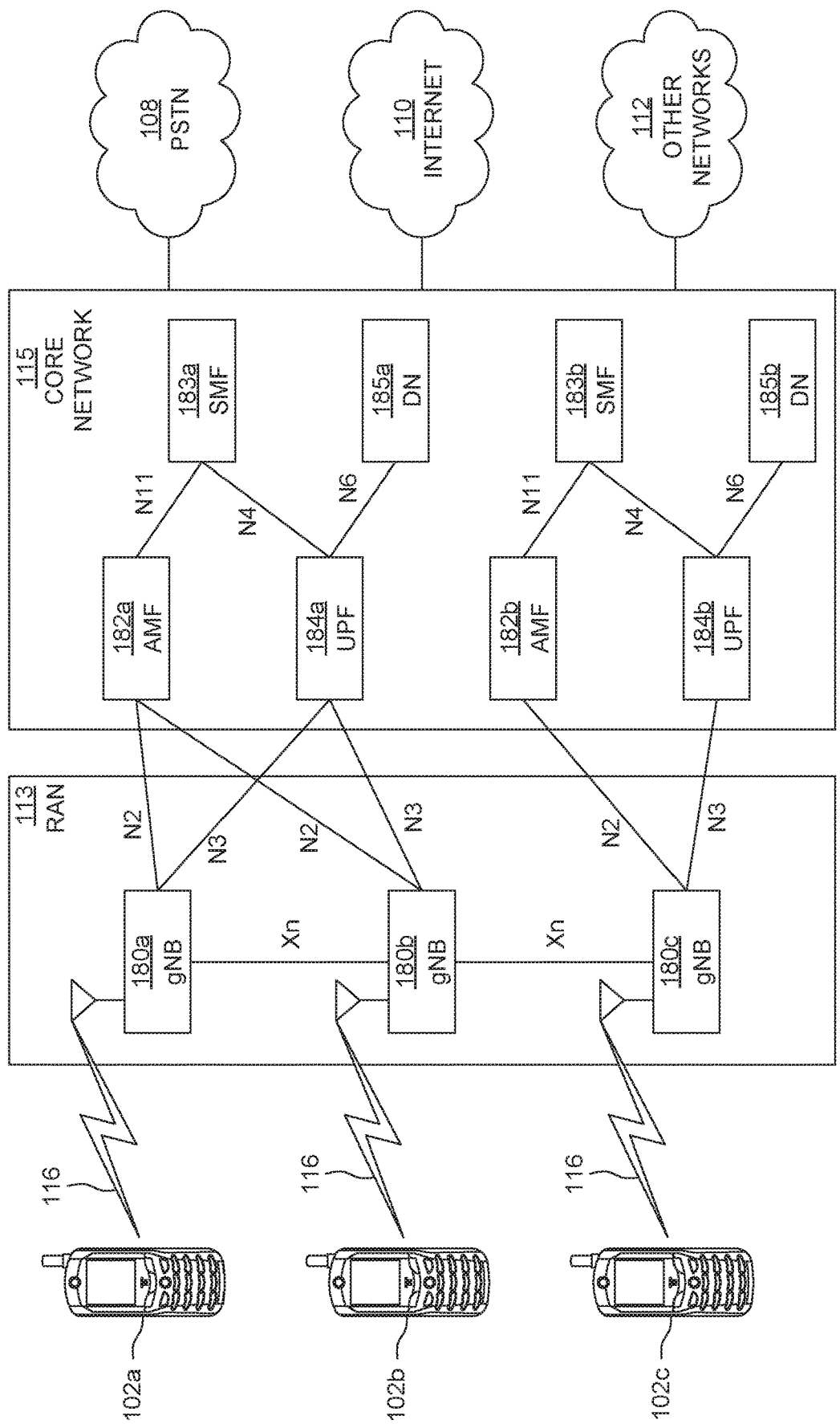
FIG. 1D is a system diagram of an example system illustrating a further example RAN and a further example CN that may be used within the communications system illustrated in FIG. 1A according to some embodiments.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

DETAILED DESCRIPTION

Systems and methods are described for an adaptive multi-fingerprint-based beam alignment scheme that adapts fingerprints using a deep learning neural network to match the current traffic conditions and location information. Multiple fingerprints are collected for different traffic conditions in a given location. The base station uses a deep learning feed-forward neural network, such as a softmax classifier, to adapt the selection of a fingerprint to the current traffic conditions and location information. Training weights may be designed offline for the selection of the fingerprint. Upon selection of the fingerprint, the base station may relay the information of the fingerprint selected to the user terminal. The base station performs a training process to select a beam-pair from the fingerprint which meets a target received signal power. The user terminal reports back the index of the beam-pair from the selected fingerprint if the beam-pair meets the threshold, thereby significantly reducing the search complexity.

A multi-functional beam transmission scheme is described to apply adaptive and intelligent multi-fingerprint-based beam alignment. Multiple beams that satisfy a target received signal power may be selected. Depending on the user terminal's requirement, the base station may use additional beams to increase multiplexing and diversity gains. If the number of RF chains is lower than the number of available beam-pairs that meet the target received power, the base station may use beam index modulation to increase the spectral efficiency.

To circumvent the necessity of LOS paths, context information-based beam-alignment was proposed, where the BS searches in the context-information-based direction. This scheme was then enhanced with the aid of complex learning techniques. However, the scheme may work well only under the premise that omni-directional reception is used at the receiver, which makes this technique impractical for mmWave communications. Moreover, when the LOS is blocked, there may be a set of other possible angle of arrivals/angle of departures (AoAs/AoDs) for steering the beam in the desired location which do not suffer from blockages under given traffic conditions.

There is a vast body of literature on fingerprint-based localization techniques, where typically the channel state information or received signal strength (RSS), which are referred to as fingerprints, are used at pre-determined locations for determining the user terminal's position. Fingerprints are collected for different locations and stored in a database. In this context, the beam-pairs (AoA-AoD) are used as a fingerprint to construct the database for different locations. However, a limiting factor for many such techniques is that the fingerprints of the database are fixed for a given location. This assumption, however, is generally not true in the context of beam-alignment because the beam-pair may change depending on the traffic conditions. The fingerprint used for a specific traffic density in a given location may be different for another traffic density in the same location.

Recently, machine learning aided wireless transmission has gained attention due to its more accurate predictions and superior performance over conventional methods dispensing with learning. More particularly, learning based approaches in localization may be more effective for minimizing the localization error.

As described in more detail below, a pre-determined fingerprint for a given location may not be optimal due to variations in the environment, such as traffic variations, mobility, and obstructions blocking an RF path, and due to device characteristics (such as hardware imperfections). Described below is a scheme, for some embodiments, that in real-time adapts fingerprint selection for a given device at a particular location under a given traffic density from a set of pre-determined fingerprints.

For some embodiments, the following process may be performed. Determine a set of fingerprints and map these fingerprints to a range of parameters (which may be quantized) (such as traffic density (congestion), location, device profile, angle-of-arrival (AoA) and angle-of-departure (AoD) for RF signals between user equipment and a base station, and RF interference). Table 1 below shows an example of multiple fingerprints for two such parameters, location and traffic density. Some embodiments may use other parameters for the mapping of fingerprints. Use a learning process to select a fingerprint, which may be an optimal fingerprint, for a given user at a given point in time. Some embodiments may use such a learning process as a way to handle the relationship between fingerprints and the varying parameters that may impact the choice of a fingerprint for a given user at a given point in time. A selected fingerprint is communicated to a user equipment device, and a beam-pair within the fingerprint set is selected to achieve a particular performance or complexity reduction target, such as a particular received signal strength (RSS) value.

System Model

Figure 2:
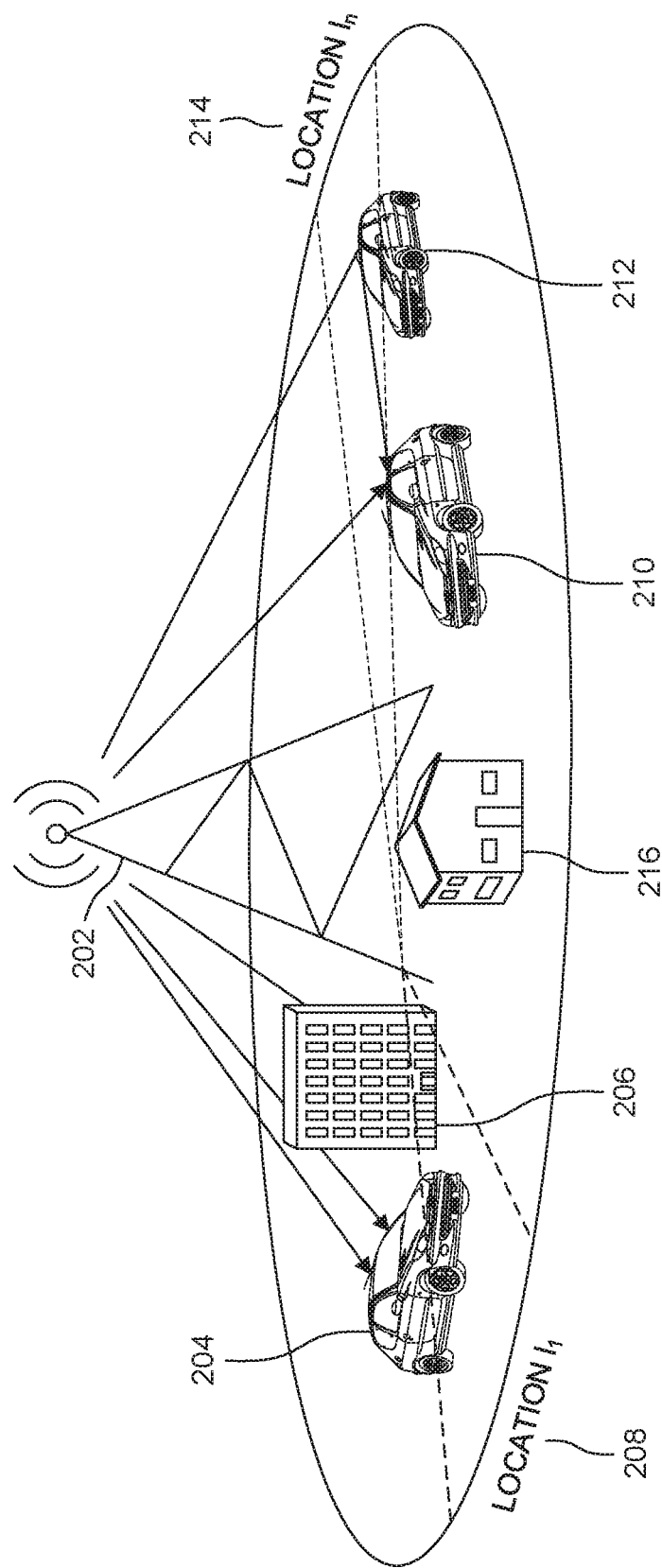
FIG. 2 is schematic illustration showing an example fingerprint based beam alignment according to some embodiments.

FIG. 2 is schematic illustration showing an example fingerprint based beam alignment according to some embodiments. Consider a vehicular scenario, where a base station (BS) 202 serves the vehicles (users, or user equipment) 204, 210, 216 in its cell. The number of vehicles $N_v$ at any point of time obeys the Poisson distribution with a mean of $\lambda$ and variance of $\lambda$. Assume that the serving cell is partitioned into N locations, where the BS is equipped with the knowledge of the fingerprints (FP) for each location 208, 214 in its database, as shown in FIG. 2. Fingerprints as used here are beam-pairs, whose AoA-AoD values may be pre-determined offline. Fingerprints (AoA-AoD pairs) are typically obtained by using beam-sweeping, where a high-resolution scanning of beam-pairs is carried out. However, given the time-varying traffic density, corresponding to the varying number of vehicles at any point of time, a single pre-determined fingerprint would not be able to provide improved performance at a reduced search complexity. This is because the AoA-AoD pair which provides high received signal power may be blocked/suppressed by obstacles 206, 212 (such as, e.g., neighboring vehicles). Hence, a multi-fingerprint-based regime is conceived for different traffic densities at a given location. Eq. 1 shows an example multi-fingerprint database:

$$FP_{\lambda_1}(l_1) = \{f^1_{(1,1)}, f^2_{(1,1)}, \ldots, f^P_{(1,1)}\} \quad \ldots \quad FP_{\lambda_1}(l_n) = \{f^1_{(n,1)}, f^2_{(n,1)}, \ldots, f^P_{(n,1)}\}$$
$$\vdots \qquad \vdots \qquad \vdots$$
$$FP_{\lambda_k}(l_1) = \{f^1_{(1,k)}, f^2_{(1,k)}, \ldots, f^P_{(1,k)}\} \quad \ldots \quad FP_{\lambda_k}(l_n) = \{f^1_{(n,k)}, f^2_{(n,k)}, \ldots, f^P_{(n,k)}\}$$

Eq. 1

FIG. 2 shows a system model, where the BS is serving a user in location $l_1$ for a traffic density $\lambda_k$ using the fingerprint $FP_{\lambda_k}(l_j)$, where the entry $f_{(k,j)}^i$ denote the i-th fingerprint at j-th location for traffic density k. Location information may be obtained from a global positioning system (GPS). Furthermore, due to the hardware complexities and power-hungry ADCs/DACs at mmWave frequencies, dedicating an RF chain to each and every antenna element may be impractical; and using analog only beamforming would result in poor angular resolution and inaccuracies.

Figure 3:
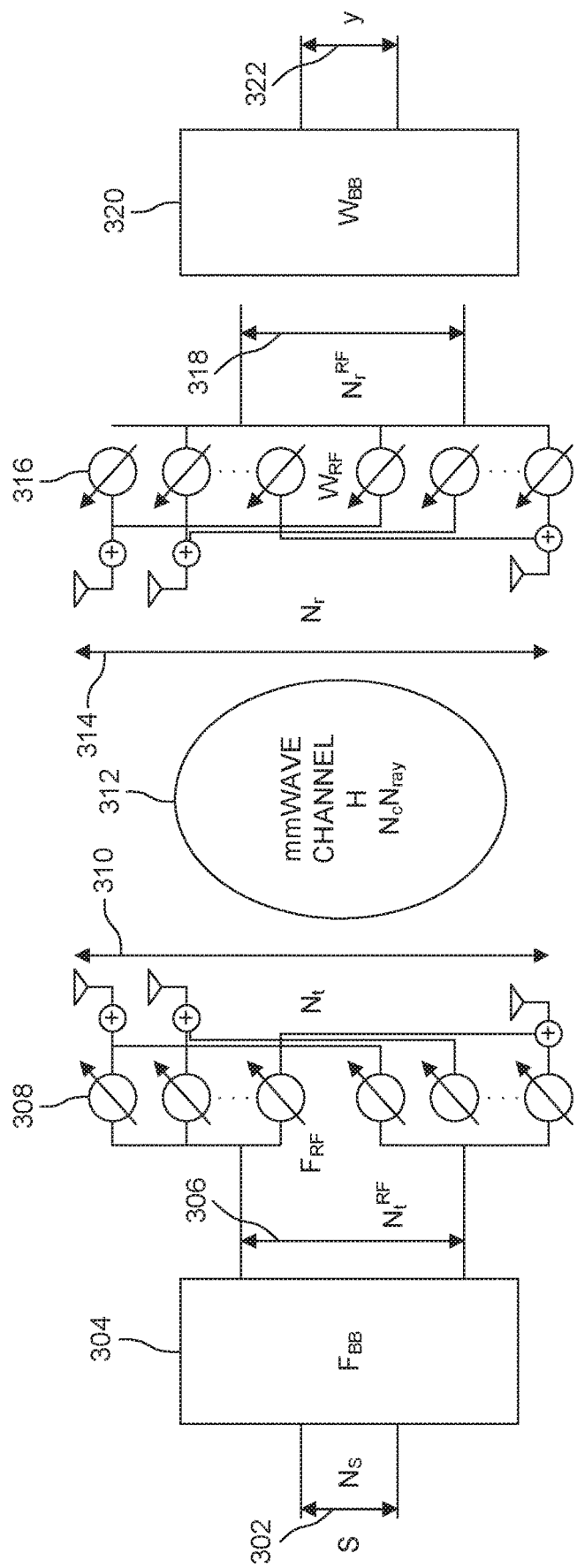
FIG. 3 is schematic illustration showing an example hybrid beamforming architecture according to some embodiments.

FIG. 3 is schematic illustration showing an example hybrid beamforming architecture according to some embodiments. Therefore, a hybrid beamforming may be used that is an amalgamation of both digital and analog beamforming. In a hybrid beamforming design, the signals are digitally precoded in the baseband and phase-shifted in the RF stage by analog phase shifters. Many hybrid beamforming architectures tend to rely either on fully-connected or on sub-array-connected designs. In the fully-connected design, each RF chain tends to be connected to all the phase shifters of the antenna array as shown in FIG. 3. By contrast, in the sub-array-connected design, the antenna array is partitioned into sub-arrays, where each RF chain is connected to only a subset of phase shifters. For a learning-aided scheme, the BS and the user may use either fully-connected or sub-array connected designs for achieving beamforming gains. However, for example, both the BS and the user use the fully-connected architecture shown in FIG. 3, in which the signals 302 are precoded digitally using the matrix $F_{BB}$ 304 in the baseband and then phase-shifted by the analog RF beamforming matrix $F_{RF}$.

The BS (transmitter) is equipped with $N_t$ transmit antennas and/VP chains, while the user (receiver) is equipped with $N_r$ receive antennas and $N_r^{RF}$ chains. Furthermore, assume that $\{(f_{RF}^1, w_{RF}^1), (f_{RF}^2, w_{RF}^2), \ldots, (f_{RF}^N, w_{RF}^N)\}$ are chosen as the beamforming vectors at the BS and at the user end, respectively, for a traffic density of $\lambda$. The received signal vector y 322 at the user is given by Eq. 2:

$$y = \sqrt{P_t} W_{BB}^H W_{RF}^H H F_{RF} F_{BB} s + W_{BB}^H W_{RF}^H n \qquad \text{Eq. 2}$$

where $F_{RF}$ 308 is the transmit beamforming matrix of size $N_t \times N_t^{RF}$ at the BS, where $N_t^{RF}$ columns 306 are constructed from the potential AoD set $\{f_{RF}^1 \ldots f_{RF}^N\}$ for $N_t$ rows 310 of transmit antennas. Similarly, $W_{RF}$ 316 is the receive beamforming matrix of size $N_r \times N_r^{RF}$ at the user end, where $N_r^{RF}$ columns 318 are constructed from the potential AoA set $\{w_{RF}^1 \ldots w_{RF}^N\}$ for $N_r$ rows 314 of receive antennas. The matrix $W_{BB}$ 320 is the receiver baseband weight matrix used in Eq. 2. Furthermore, s is the transmitted symbol, n is the noise vector of identical and independent distributed entries with distribution $e\mathcal{N}(0, \sigma^2 I)$, while H is the statistical mmWave channel model 312 of size $N_r \times N_t$ expressed as given in Eq. 3:

$$H = \sqrt{\frac{N_r N_t}{N_c N_{ray}}} \sum_{n_c=1}^{N_c} \sum_{n_{ray}=1}^{N_{ray}} \alpha_{n_c}^{n_{ray}} a_r(\phi_{n_c}^{n_{ray}}) a_t^T(\phi_{n_c}^{n_{ray}}) \qquad \text{Eq. 3}$$

while $\alpha_{n_c}^{n_{ray}} \sim e\mathcal{N}(0,1)$ is a complex-valued Gaussian random variable, whose amplitude and phase are Rayleigh and uniformly distributed, respectively. For a uniform linear array (ULA) having $N_r$ and $N_t$ antenna elements the response vectors $a_r$ and $a_t$ are expressed as given in Eqs. 4 and 5:

$$a_r(\phi_r) = \frac{1}{\sqrt{N_r}} \left[1 \; e^{j\left(\frac{2\pi}{\lambda}\right)d\cos(\phi_r)} \; \ldots \; e^{j\left(\frac{2\pi}{\lambda}\right)(N_r-1)d\cos(\phi_r)}\right]^T \qquad \text{Eq. 4}$$

$$a_t(\phi_t) = \frac{1}{\sqrt{N_t}} \left[1 \; e^{j\left(\frac{2\pi}{\lambda}\right)d\cos(\phi_t)} \; \ldots \; e^{j\left(\frac{2\pi}{\lambda}\right)(N_t-1)d\cos(\phi_t)}\right]^T \qquad \text{Eq. 5}$$

where $\phi_r$ and $\phi_t$ are the angles of arrival and departure, respectively.

Figure 4:
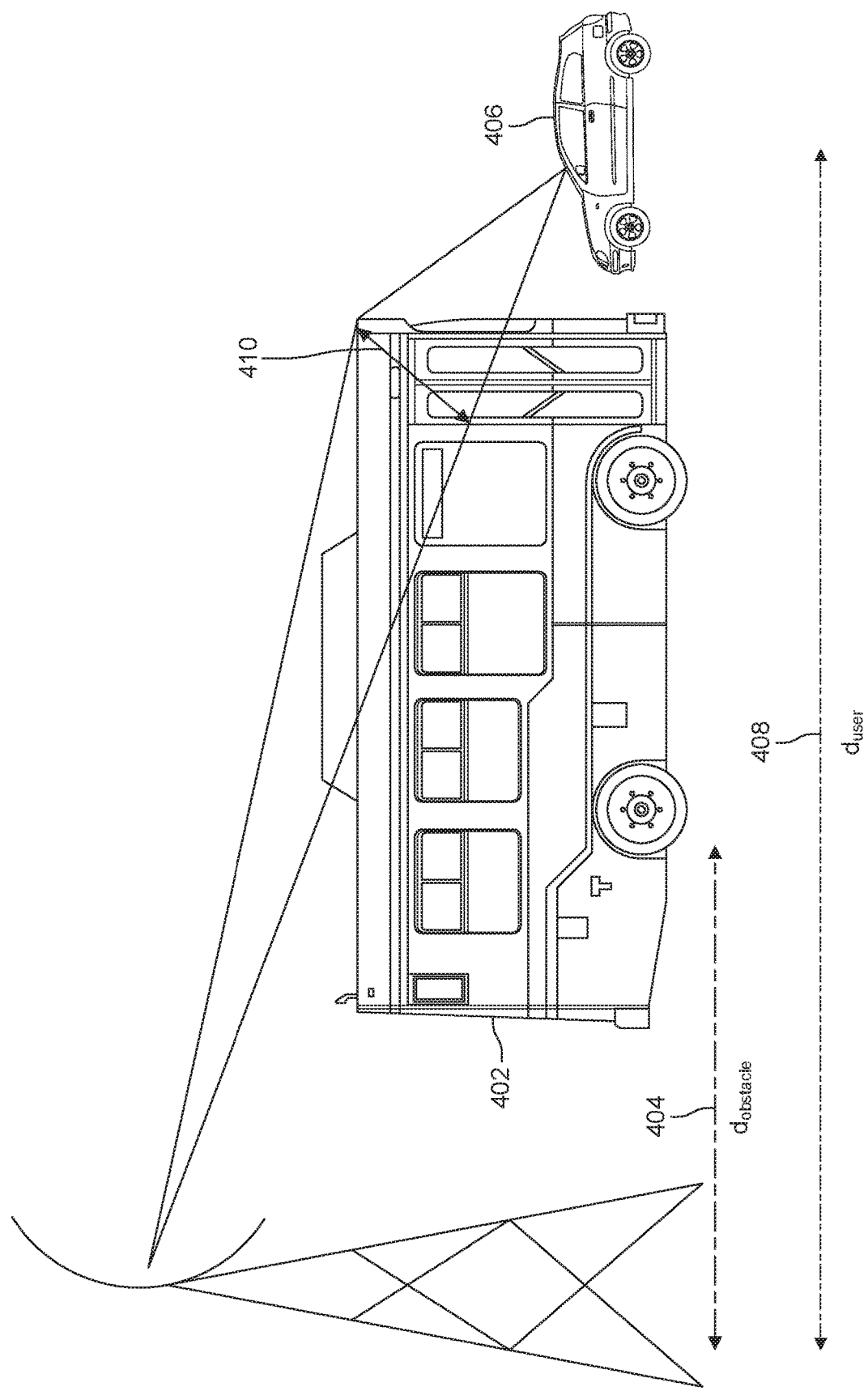
FIG. 4 is schematic illustration showing an example knife-edge diffraction caused by the vehicle obstacle according to some embodiments.

FIG. 4 is schematic illustration showing an example knife-edge diffraction caused by the vehicle obstacle according to some embodiments. The received signal strength (RSS) may be used as a performance metric to determine the beam-pair for a successful transmission.

Furthermore, for the construction of the fingerprints database, we accounted for the attenuation and blockage caused by neighboring vehicles in addition to the path loss experienced by the mmWave carrier. To achieve this, a multiple knife-edge model may be used. For a given location, each fingerprint is constructed for each traffic density, by accounting for the total attenuation caused by the vehicles. The attenuation caused by each vehicle using single knife-edge is given by Eq. 6:

$$A = \begin{cases} 6.9 + 20\log_{10}\left[\frac{\sqrt{(v-1)^2+1}+}{v-0.1}\right] & A_v > -0.7 \\ 0 & \text{otherwise} \end{cases} \quad \text{Eq. 6}$$

where $$v = \frac{\sqrt{2}h}{r_f},$$

h is the height 410 of the obstacle 402 from the line joining the BS and the user 406, and $r_f$ is the Fresnel ellipsoid radius expressed as given in Eq. 7:

$$r_f = \sqrt{\frac{\Lambda d_{obstacle} d_{user}(d_{user} - d_{obstacle})}{d_{user}}} \quad \text{Eq. 7}$$

where $\Lambda$ is the wavelength, $d_{user}$ 408 is the distance between the transmitter and user, while $d_{obstacle}$ 404 is the distance between the transmitter and an obstacle as shown in FIG. 4.

The path loss experienced by the signal at a distance of d for a transmit and receive antenna gain of $G_t$ and $G_r$, respectively, is given by Eq. 8:

$$PL_{[dB]} = PL_0 + 10n_p\log_{10}\left(\frac{d}{d_0}\right) + S_{\sigma_0} + G_t + G_r \quad \text{Eq. 8}$$

where $d_0$ is the close-in reference distance, $S_{\sigma_0}$ is the shadowing factor, while $PL_0$ is the free-space path loss. Furthermore, for a given wavelength ($\Lambda$) the free-space path loss is expressed as Eq. 9:

$$PL_0 = 20\log_{10}\left(\frac{4\pi d_0}{\Lambda}\right) \quad \text{Eq. 9}$$

Therefore, the total received power after accounting for both the path loss and the attenuation caused by a vehicle is given as Eq. 10:

$$P_r = P_t - PL_{[dB]} - A \quad \text{Eq. 10}$$

Eq. 11 is due to large scale fading. However, considering the small scale fading as well as the beamforming and combining effects, the net received power $P_{r_{net}}$ is expressed as shown in Eq. 11:

$$P_{r_{net}} = P_r + 10\log_{10}\|W_{BB}^H W_{RF}^H H F_{RF} F_{BB}\|_F^2 \quad \text{Eq. 11}$$

while the capacity is given by Eq. 12:

$$C = \log_2(I + P_r Z^{-1}(W_{BB}^H W_{RF}^H H F_{RF} F_{BB}) \\ (W_{BB}^H W_{RF}^H H F_{RF} F_{BB})^H) \quad \text{Eq. 12}$$

where $Z = \sigma_n^2(W_{BB}^H W_{RF}^H(W_{RF} W_{BB})$, $\sigma_n^2$ is the noise variance. The net received power $P_{r_{net}}$ is observed for the fingerprint construction. A beam sweeping action is carried out initially for N locations at discrete traffic densities and then the specific beam-pairs which achieve the target RSS are stored in the database. In other words, the AoA-AoD fingerprint is obtained by conducting a high-resolution beam search campaign by accounting for all blockages caused by obstacles. The fingerprint construction is typically carried out offline either by computer-generated environment simulations, or in real time during the BS installation.

Issues Addressed in Some Embodiments

Achieving accurate beam-alignment in directional transmission systems is challenging, especially at mmWave frequencies because of its high susceptibility to blockages. To circumvent this problem, a fingerprint-based beam-alignment technique may be used. In broader terms, having an accurate fingerprint may be viewed as side-information, which may be used for enhancing system performance.

The fingerprint may include a set of selected beam-pairs for a given location, over which a communication link may be established. Typically, a fingerprint is constructed for each location during the network deployment stage by taking the surrounding environment into account, such as buildings, lamp posts, and vehicles. Fingerprints (e.g., a set of possible beam pairs) that provide pairs of beams with specific angle of arrival—angle of departure (AoA-AoD) beams, are typically obtained by using beam-sweeping such that high-resolution scanning of beam-pairs is performed initially for N locations at discrete traffic densities. The specific beam-pairs that achieve a target RSS are stored in a database. An AoA-AoD fingerprint may be obtained by conducting a high-resolution beam search campaign by accounting for all blockages caused by obstacles. Fingerprint construction is typically performed offline either by computer-generated environment simulations or in real time during network roll-out.

The traffic variation of users and vehicles may limit strictly the performance of the fingerprint. This limitation is because the direction of the beam or the number of beam-pairs available is highly dependent on the density and position of users and vehicles on the road. The direction of the beam or the number of beam-pairs available depend on the traffic conditions, which are time-varying. For example, the traffic density in the morning is different from that in the afternoon, or during special events. To respond to these environment changes, multiple fingerprints may be used for a given location, and fingerprint selection may be adapted dynamically to match traffic conditions in a given location at a given point of time. These challenges are addressed herein.

In some embodiments, a multi-fingerprint-based beam alignment scheme is provided in which a base station (BS), aided by learning, adapts fingerprints to traffic conditions at a given location. The multi-fingerprint-based beam alignment scheme may be applied to design a multi-functional beam transmission in which a plurality of beam-pairs satisfying an RSS threshold are selected to attain higher multiplexing and diversity gains.

Learning-Aided Multi-Fingerprint Based Beam-Alignment

Fingerprints may be constructed empirically offline during the network deployment stage. The construction of the fingerprints depends on the topology of the road structure and buildings, which are static and do not change within short time scales, but the topology may change if a new building is erected. The changes in the environment may be attributed to the ever-changing mobile user traffic. In the absence of traffic, the fingerprints constructed during the network design stage may apply indefinitely, unless the area topology changes. However, because of the time-varying mobile user traffic conditions, the number of beam-pairs in the set of options may be subject to change. Therefore, fingerprints may be constructed for different traffic densities by allowing the user devices (or users) to identify potential beam-pairs by conducting beam-sweeping during the beam-pair training phase. This process may be repeated for different densities or traffic conditions. Furthermore, the number of fingerprints required is location specific and may be determined empirically.

An example multi-fingerprint based database is shown in Table 1, such that, e.g., $BP_2$ represents a legitimate angle of departure, e.g., AoD (which may be equal to 30°), whose corresponding angle of arrival pair may be AoA (which may be equal to 60°), and may be indexed as beam-pair 2 (AoD-AoA). Similarly, $BP_{10}$ denotes beam-pair 10, whose angles of departure and arrival may be 110° and 270°, respectively. By generalizing, $BP_x$ denotes the beam-pair of any angle of departure paired with the corresponding angle of arrival, denoted by index X. The database may be constructed by calculating the net received power for each location at different traffic conditions.

TABLE 1

Example Multi-Fingerprint Database

| Location | Traffic Density | Beam-Pairs (BP) |
|---|---|---|
| $L_1$ | $\lambda_1$ | $BP_2, BP_{10}, BP_{23}, \ldots$ |
| $L_1$ | $\lambda_2$ | $BP_{320}, BP_{210}, BP_3, \ldots$ |
| . | . | . |
| . | . | . |
| . | . | . |
| $L_k$ | $\lambda_1$ | $BP_1, BP_9, BP_{300}, \ldots$ |
| . | . | . |
| . | . | . |
| . | . | . |
| $L_n$ | $\lambda_3$ | $BP_{21}, BP_6, BP_{250}, \ldots$ |

This relationship may be represented by a look-up table for link-adaptation, such that, depending on the traffic density and on the location, a corresponding fingerprint may be selected. For example, if the user is at the location $L_1$ and the base station (BS) estimates the traffic density as $\lambda_2$, the BS may select the fingerprint of beams $\{BP_{320}, BP_{210}, BP_3, \ldots\}$. The BS shares this information with the user device, whereupon the BS and user device invoke a beam search for identifying the best beam-pair among the available beam-pairs for the fingerprint selected. This process significantly reduces the search space involved in the beam-alignment. To further reduce the search complexity, an RSS threshold may be set, such that the user device selects a specific beam-pair whose observed RSS value is higher than the threshold. Having selected the beam-pair, the user device relays this information to the BS, eliminating a search over successive beam-pairs.

Whereas the above multi-fingerprint adaptation scheme may enhance the performance compared to that of a single fingerprint based beam-alignment, the performance gain may become limited if the threshold values, such as RSS observed in a fingerprint at a given location L for a traffic density 2L of the lookup table, become outdated. Hence, there may be a challenge attaining perfect beam alignment.

To counter this challenge, learning-aided multi-fingerprint-based beam alignment may be used. Using a learning-aided scheme may eliminate dependence on traffic condition threshold values (which are enumerated in Table 1) for fingerprint selection. This is because the values may become outdated due to imperfections in the channel and impairments, such as problems in the ADCs/DACs.

A neural network may be used for intelligent adaptation between multiple fingerprints. Using a neural network may reduce complexity and provide superior performance. A learning-aided scheme may have two stages: (i) a training phase and (ii) a testing phase. In the training phase, the weight vectors of the network are computed using training samples, such that the input and output are known. This process is classified as a supervised learning technique, such that the training weights are designed using supervision. The training weights may be calculated offline, and these calculations do not impose real time overhead on the system.

Figure 5A:
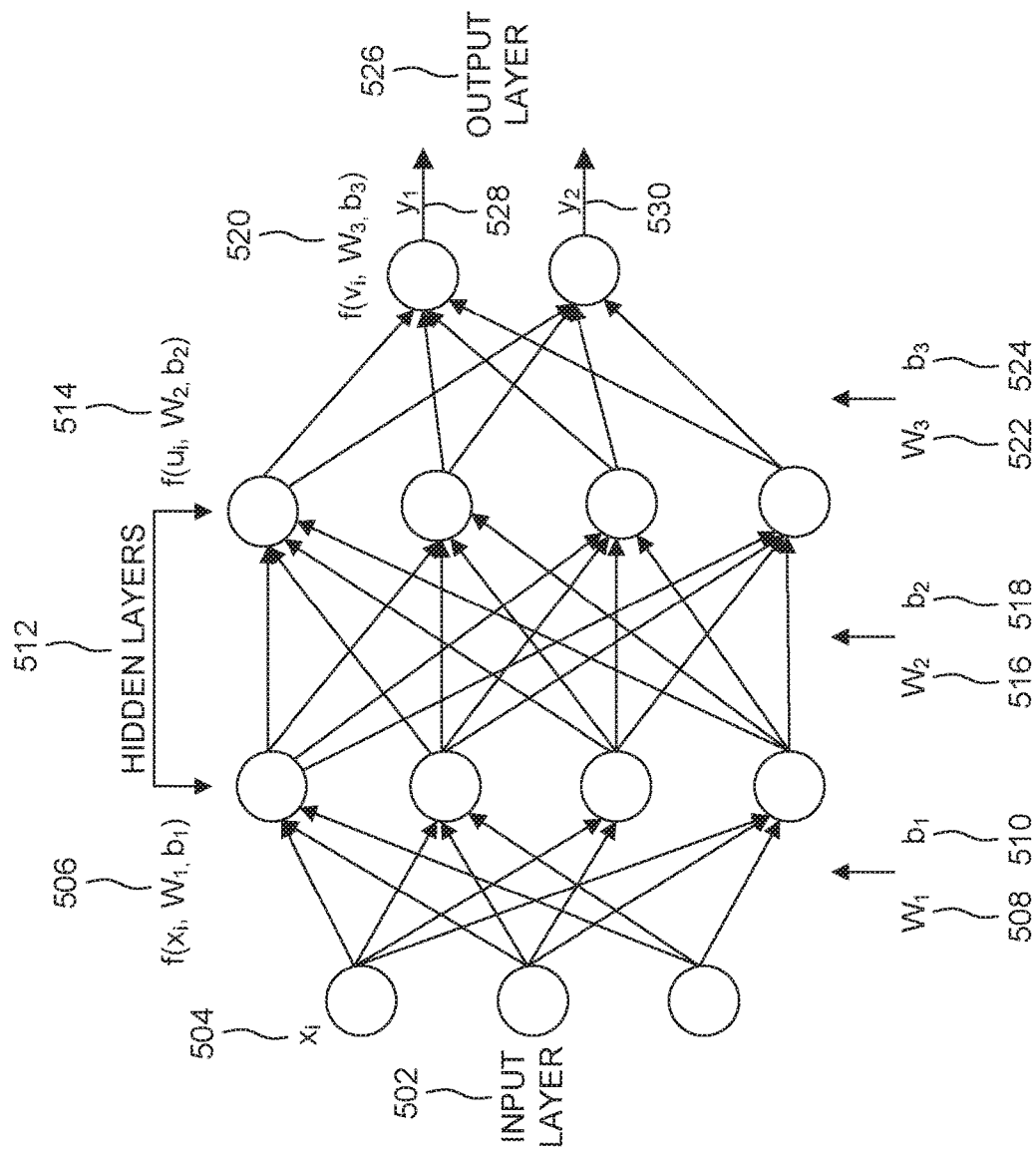
FIG. 5A is schematic illustration showing an example neural network model according to some embodiments.
Figure 5B:
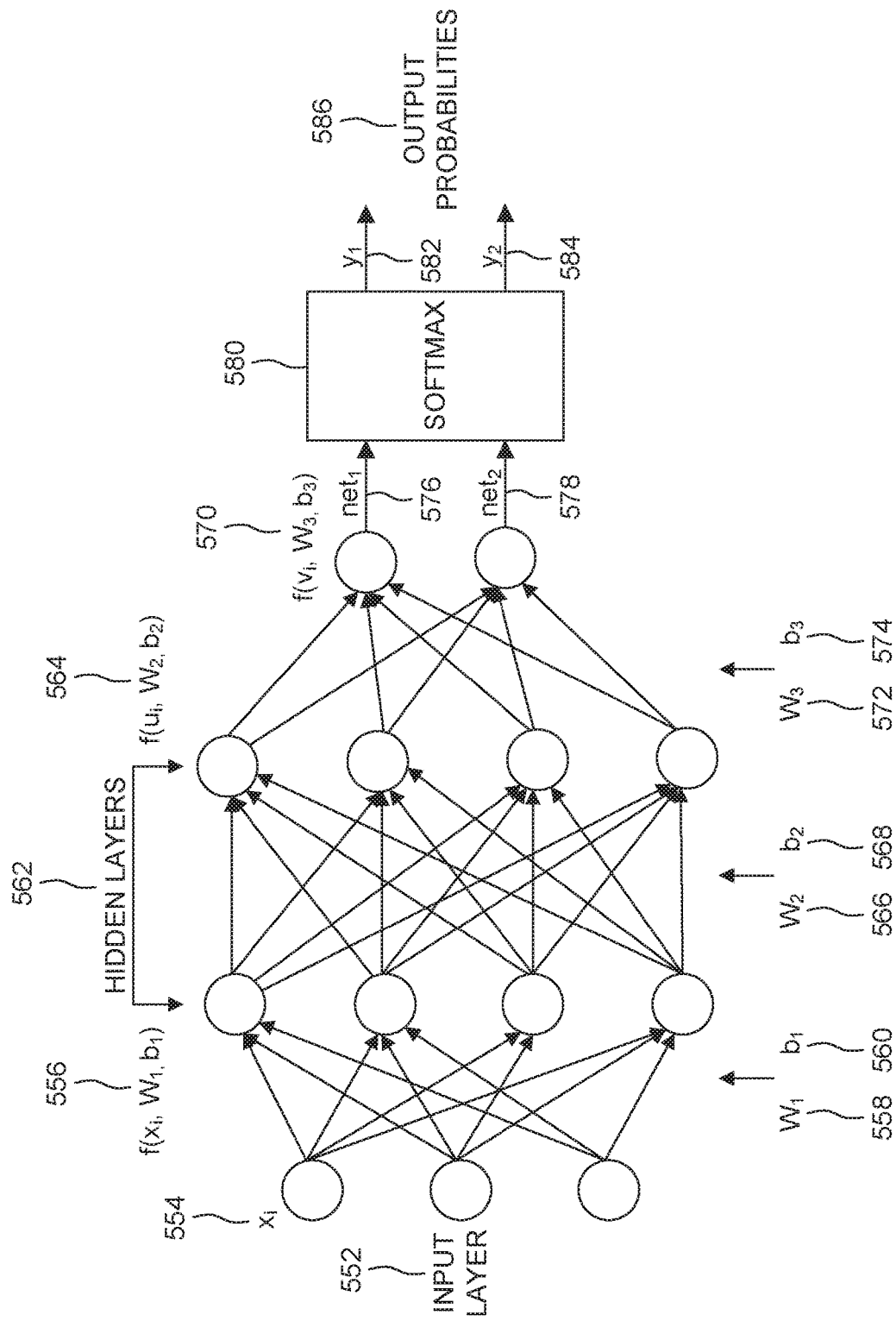
FIG. 5B is schematic illustration showing an example softmax feedforward neural network model according to some embodiments.

FIG. 5A is schematic illustration showing an example neural network model according to some embodiments. FIG. 5B is schematic illustration showing an example softmax feedforward neural network model according to some embodiments. A neural network is referred to as a deep neural network if the number of hidden layers 512, 562 is higher than one, such as shown in FIGS. 5A and 5B, in which the number of hidden layers is two for each figure. As seen in FIGS. 5A and 5B, the training samples are passed to the input layer and the weights are designed for minimizing the error, which is the difference between the true and predicted output values. In FIGS. 5A and 5B, $W_1$ 508, 558, $W_2$ 516, 566, and $W_3$ 522, 572 are the weights and $b_1$ 510, 560, $b_2$ 518, 568, and $b_3$ 524, 574 are the biases for going from the input layer 502, 552 to each of the hidden layers 512, 562 to the output layer 526, respectively, such that W(p,q) denotes the weight attached between the nodes p and q. Matrix $x_i$ 504, 554 is the input of the network. Matrices $u_i$ and v are neuron input matrices at the nodes of the network, where i denotes the class. For FIG. 5A, $y_1$ 528 and $y_2$ 530 are the neural network outputs. For FIG. 5B, $net_1$ 576 and $net_2$ 578 are the neural network outputs, while $y_1$ 582 and $y_2$ 584 are the output probabilities 586 outputted by the softmax function 580.

In the learning-assisted scheme, each fingerprint corresponds to a class. Furthermore, the output of each hidden layer is determined by an activation function $f(\ )$ 506, 556, 514, 564, 520, 570, also called a score function, which determines the performance of the system. The choice of the activation function may depend on the analytical tractability, computational complexity and the type of output signal. A loss function characterizes the error (loss) between the predicted outcome and the real outcome in the training samples.

In a learning-assisted scheme, the choice of the fingerprint (or class) may be determined by the output probabilities associated with each fingerprint. The fingerprint having a high probability may be selected. Because the scheme uses probabilities at the output, the choice of the fingerprint may be interpreted as a logistic regression having multiple classes, such that each fingerprint constitutes a class. FIG. 5B shows a softmax function for the activation (or score) function to generate output probabilities. Sometimes, the resultant neural network is referred to as a softmax neural network.

Each layer of FIG. 5A is assigned a score by the activating function. However, since we deal with the probabilities of specific outcomes, the linear weights are translated to probabilities by a softmax function 580 at the output, as shown in FIG. 5B and expressed as in Eq. 13:

$$f_i(z) = \frac{e^{z_k}}{\sum_k e^{z_k}} \quad \text{Eq. 13}$$

where z is the score vector at the layer before the output probabilities are calculated, which is given by Eq. 14:

$$z = f(x_i, W, b) = Wx_i + b \quad \text{Eq. 14}$$

In Eq. 14, W is the weight matrix of the layer, b is the bias vector, while $x_i$ is the input of the layer, as shown in FIG. 5B. As an example, let us consider FIG. 5B, where the softmax function 580 is applied at the output layer to the scores net$_1$ 576 and net$_2$ 578, which are calculated using the weight matrix $W_3$ 572 and bias vector $b_3$ 574. Note that the softmax function 580 is employed only at the output layer to generate output probabilities 586, while for all other layers, only the scores attained using Eq. 14 are calculated as shown in FIG. 5B In one embodiment, the input vector $x_i$ is a three-dimensional vector holding the location, traffic density and RSS values, while the output represents the probabilities associated with each fingerprint. In other words, the output takes the form of $[0 \ldots 0\ 1\ 0 \ldots 0]^T$, where 1 is the probability associated with that particular fingerprint. Location parameters may be specified in terms of latitude and longitude values, or angle and distance with respect to the base station The weight matrices are initially chosen as random from the distribution N(0, 1), hence the prediction at the output would be erroneous. Therefore, to improve the prediction of the fingerprint for a given traffic density and location, a loss function is introduced which is a measure of difference between the predicted probability and the true probability associated with the given class. In other words, by considering the loss function, the weight matrices are optimized for ensuring the loss is minimized. For some embodiments, weight matrices and bias vectors are updated based on error backpropagation to reduce the loss function.

More explicitly, for some embodiments, the divergence between the real and predicted probability distributions is minimized or at least reduced. This loss function can also be interpreted as the Kullback-Leibler divergence between two distributions. Thus, for distributions p and q it is expressed as in Eq. 15:

$$D_{KL}(p\|q) = \Sigma_S p((i) \log_{10}(q(i)) \quad \text{Eq. 15}$$

where in our case, p (i) is the probability of the correct class i, which is p (i)=$[0 \ldots 1 \ldots 0]$, while q is the function in Eq. 13. Upon substituting Eq. 13 into Eq. 15, Eq. 16 is generated:

$$D_{KL}(p\|q) = -\sum_S \log_{10}\left(\frac{e^{z_i}}{\sum_k e^{z_k}}\right) \quad \text{Eq. 16}$$

where S is the number of training samples.

Additionally, we have the cross-entropy of $\mathcal{H}$ (p,q)= $\mathcal{H}$ (p)+$D_{KL}$(p|q), where $\mathcal{H}$ (p)=0 holds, since there is no uncertainty in the correct class. Therefore, this loss function may also be referred to as cross-entropy loss.

Having defined the cross-entropy loss$_3$, the total loss function over all classes associated with a regularization penalty of R(W) is given as Eq. 17:

$$L = -\frac{1}{s}\sum_S \log_{10}\left(\frac{e^{z_i}}{\sum_k e^{z_k}}\right) + R(W) \quad \text{Eq. 17}$$

where we have $$R(W)c = \frac{\lambda}{2}\|W\|_2^2$$

and S is the total number of training samples. The rationale behind adding a regularization term in Eq. 17 is to ensure that it does not result in over-fitting.

We now aim for minimizing Eq. 17 by computing the gradient with respect to the weight matrix $W_3$ and the bias $b_3$ of FIG. 5B. To achieve this, we compute the gradient for each class whose weights are now $W_3^i$ and bias $b_3^i$, where i represents the class. Note that $z_i$ in Eq. 17 is a function of the weight matrix $W_3$ and bias vector $b_3$. After a series of steps, the gradient with respect to $W_i$ and $b_i$ is given as $$\frac{\partial L}{\partial W_3^i} = (f_i - \delta_{ik})x + \lambda W_i, \delta_{ik} = \begin{cases} 1 & i = k \\ 0 & \text{otherwise} \end{cases} \quad \text{Eq. 18}$$

$$\frac{\partial L}{\partial b_3^i} = f_i - \delta_{ik} \quad \text{Eq. 19}$$

Thus, using gradient-descent generates $$W_i^3 = W_i^3 - \alpha\frac{\partial L}{\partial W_3^i} \quad \text{Eq. 20}$$

$$b_i^3 = b_i^3 - \alpha\frac{\partial L}{\partial b_3^i} \quad \text{Eq. 21}$$

where $\alpha$ is the step-size. Similarly, weight matrices $W_1$ and $W_2$, and bias vectors $b_1$ and $b_2$ are obtained by employing the gradient of the loss function in Eq. 18 with the respective matrix W and vector b. This process is called error backpropagation. Example pseudo-code of the learning-aided fingerprint-based algorithm is presented in Table 2. The weight matrix W and bias vector b of the network are computed offline and stored in memory. This entire process is carried out during the training phase.

Table 2 shows pseudo-code for a learning-aided fingerprint-based method. The weight matrix W and the bias vector b of the network may be computed offline and stored in memory. This entire process may be performed during the training phase.

TABLE 2

| Pseudo-code for a Learning-Aided Fingerprint Based Method |
|---|
| Offline Training Weight Process:<br>• Input: Training samples for each training location<br>• Output: A fingerprint<br>• Initialize matrices $W_1$, $W_2$, $W_3$ with random values |

TABLE 2-continued

Pseudo-code for a Learning-Aided Fingerprint Based Method

Figure 6:
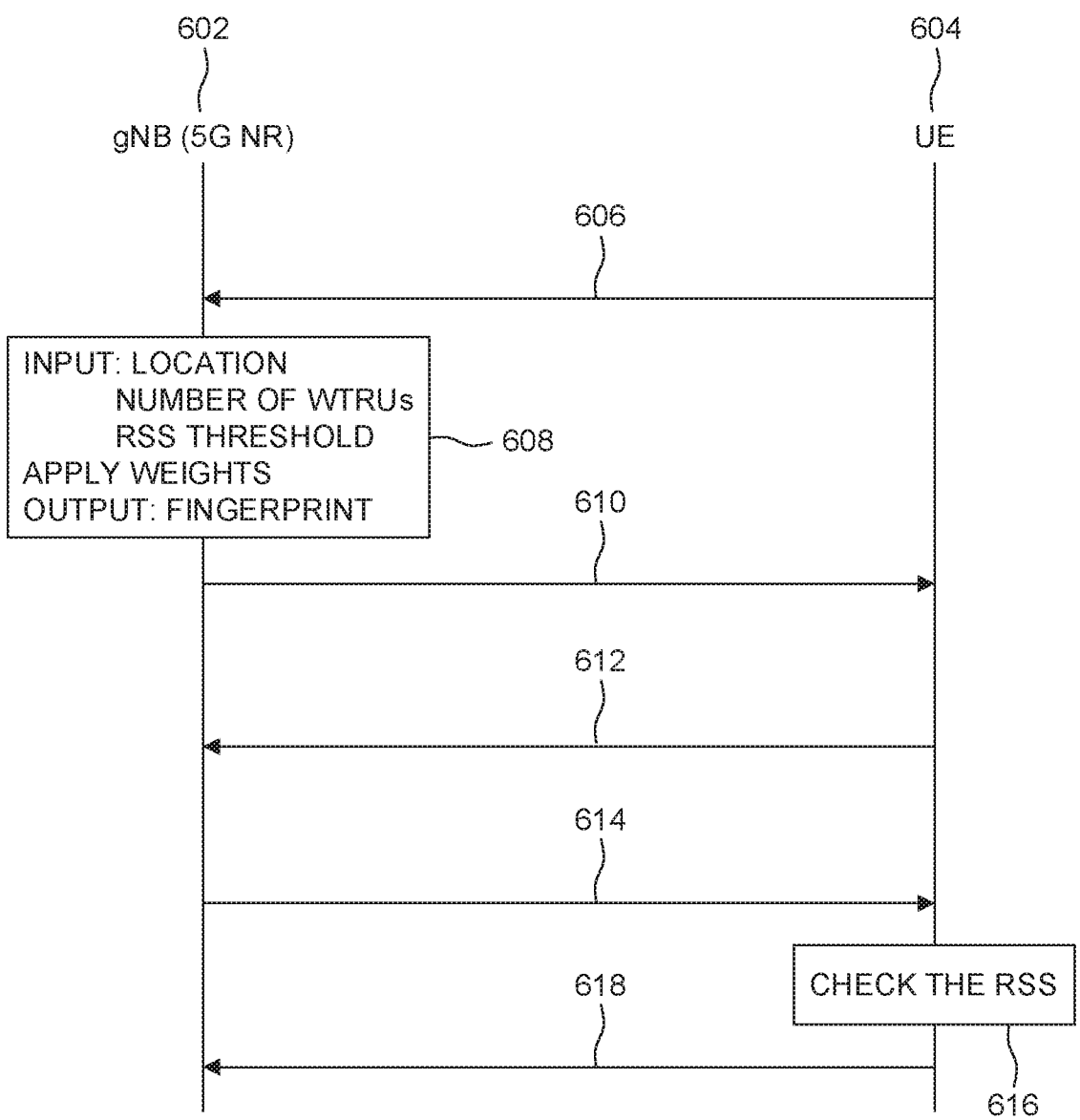
FIG. 6 is a message sequencing diagram illustrating an example process for beam alignment according to some embodiments.

- Loop until convergence of Eq. 18:
    - Compute the output of f( ) using Eq. 14 for each layer with the assigned weights
    - Apply the softmax function using Eq. 13 to obtain the probabilities for each class
    - Obtain the weight matrices by Eq. 20 and the bias vectors by Eq. 21
    - Perform error backpropagation Online Fingerprint Calculation Process:
- Input the location, the number of vehicles, and the target RSS
- Apply training weights determined by the offline training weight process
- Output the fingerprint FIG. 6 is a message sequencing diagram illustrating an example process for beam alignment according to some embodiments. FIG. 6 shows an example of a real-time, testing stage process mentioned previously. During the initial access, the BS (e.g., gNB for 5G NR) 602 communicates with the user (e.g., using lower frequencies), in which the BS 602 estimates the location of the user (or user device). For some embodiments, the user equipment 604 may send 606 location information using an initial access. The BS 602 also has information 608 indicating the number of users (vehicles) in its cell, which may be used for estimating vehicular/traffic density ($\lambda$). Furthermore, the user device 604 relays the information of its RSS threshold requirements to the BS 602. With the number of users (vehicles), the RSS threshold, and the location as input parameters, the BS 602 uses a softmax method with the weights and bias calculated during the training stage. The method is used to predict the probability of each class (or each fingerprint), and the BS 602 selects the fingerprint having the highest probability. Upon selecting the fingerprint, the BS 602 communicates 610 to the user (UE) 604 the set of beam-pair options. The user equipment 604 may send 612 an acknowledgement. The BS 602 may conduct 614 a beam search over this set of selected beam-pairs. For some embodiments, the beam search is performed by the transmitter choosing a given beam (from a transmit beam of a beam pair associated with the fingerprint) and transmitting using this beam. The receiver performs measurements of the signal received on this beam (using a corresponding receive beam from the given beam pair associated with the fingerprint) to see if the beam pair meets a desired quality. This process may be repeated for one or more beams pairs in a set. The repetition may be limited if the receiver sends feedback to the transmitter indicating an acceptable beam pair has been identified, which may be done to reduce the size of the search space. At the end of the beam search loop, one or more beams (or one or more beam-pair indices) may be selected to use to transmit data to the receiver. For some embodiments, selecting the one or more beams may be done using a multi-functional beam transmission scheme. For some embodiments, the initial beam search process to identify beam pairs to associate with a fingerprint may be done for a coarse beam tuning, and then the beam search during final beam selection (and subsequent operation) may include a further beam fine tuning using baseband processing and filtering for further refinement. For some embodiments, the fine beam search may be repeated until a given resolution level is reached. For some embodiments, the beam search may be repeated periodically. For some embodiments, the beam search may be repeated if a triggering event occurs, such as a change in a parameter of the user equipment (such as a change of input parameters due to UE movement or traffic density variation) or a change of another parameter (which may not be part of the input parameters to the ANN), such as a change of priority for serving the given UE (receiver) with the selected set of one or more beams. The user 604 then communicates 618 back the specific beam-pair index which meets its postprocessing RSS threshold. A message sequence diagram illustrating the method is shown in FIG. 6.

Multi-Functional Beam Transmission

Figure 7:
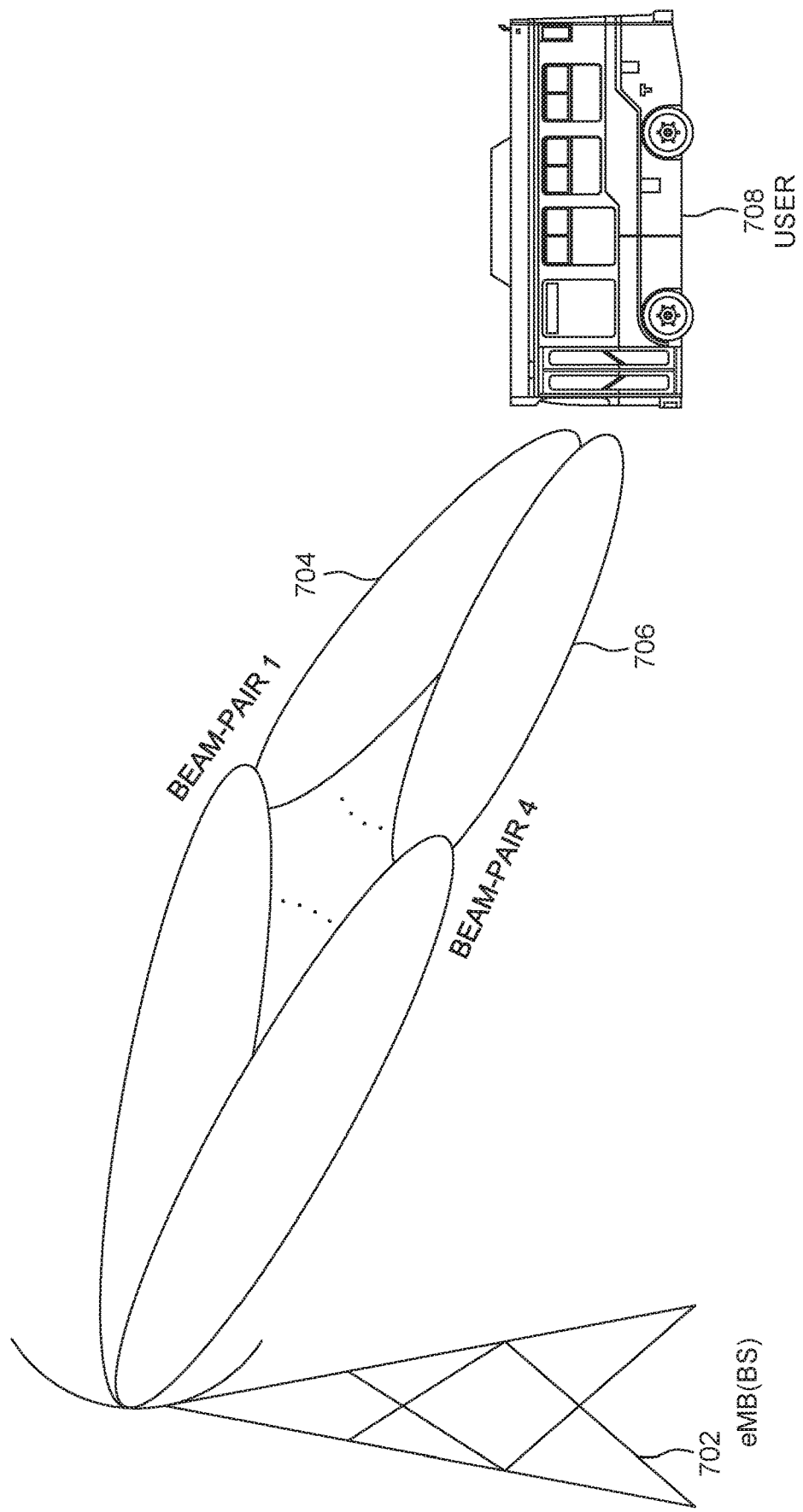
FIG. 7 is schematic illustration showing an example selection of beam-pairs to attain diversity/multiplexing gains according to some embodiments.

FIG. 7 is schematic illustration showing an example selection of beam-pairs to attain diversity/multiplexing gains according to some embodiments. A multi-functional beam transmission may allow some tolerance in the beam search complexity using the scheme described above. A multi-functional beam transmission may be used to increase the spectral efficiency and enhance the performance. Such methods may use the assumption that a plurality of beam-pairs exist which satisfy the RSS threshold. As previously discussed, the BS 702 conducts a beam search using the selected fingerprint, such that the user device chooses the specific beam-pair which satisfies the target RSS and communicates back to the BS the index of the specific beam-pair. By contrast, in the multi-functional beam transmission, the user 708 chooses several beam-pairs 704, 706 which satisfy the RSS threshold at the expense of increased search complexity, as shown in FIG. 7. There may be a scenario in which there is no additional beam-pair despite the increased beam search of the successive beam-pairs. These additional beam-pairs may be used to achieve diversity and/or multiplexing gains. The number of beams that may be used may be limited by the number of RF chains.

Figure 8:
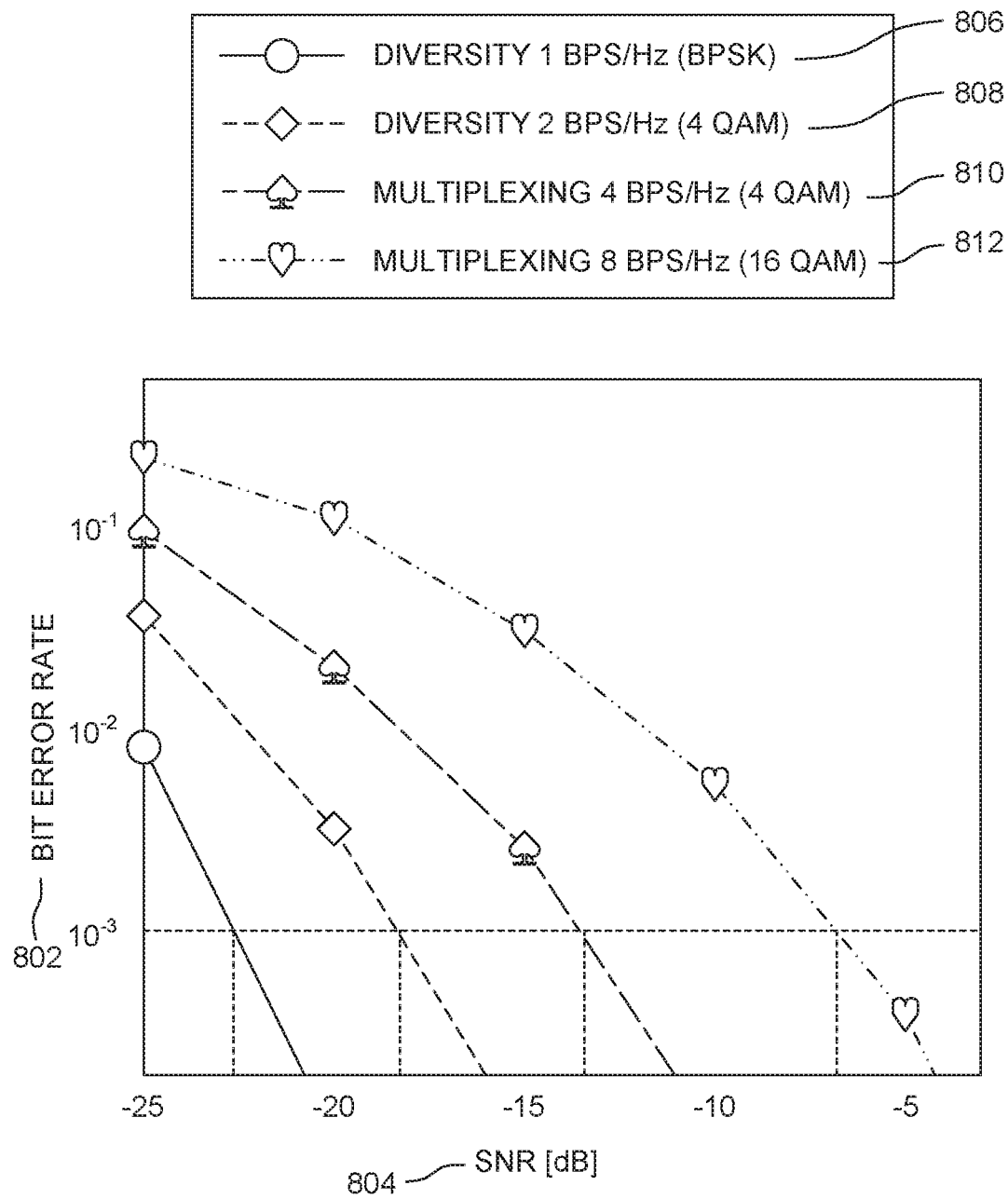
FIG. 8 is a graph illustrating example bit error rates for a spatial diversity and spatial multiplexing aided scheme according to some embodiments.

FIG. 8 is a graph illustrating example bit error rates for a spatial diversity and spatial multiplexing aided scheme according to some embodiments. FIG. 8 shows the plot of average BER 802 against the average SNR 804 for different transmission schemes 806, 808, 810, 812 communicating over the mmWave channel using a 64×32 element MIMO scheme with two RF chains at both the BS and the receiver. In the plot of FIG. 8, two spatial streams are used for spatial multiplexing, while only a single spatial stream is used when aiming for diversity. The plot shows that the diversity-oriented schemes 806, 808 perform better than spatial multiplexing schemes 810, 812, which are aimed at attaining higher data rates.

Given the eligible beam-pairs observed, the BS-user pair may use link-adaptation depending on the nature of the channel in each beam. Depending on the post-processing SNR observed by the user device, the BS may use diversity or multiplexing. The user may opt for diversity if the channel is in a deep fade and may opt for multiplexing otherwise. Furthermore, the BS may adjust (or optimize for some embodiments) the power allocation for each beam in conjunction with multiplexing- and diversity-aided transmission. Following conventional link-adaptation, the specific SNR threshold values that attain the target BER of $10^{-3}$ are shown in FIG. 8 with vertical lines for each scheme.

After calculation of the instantaneous post-processed SNR, the receiver determines the transmission scheme type and the modulation mode by comparing the instantaneous post-processed SNR against the pre-defined threshold values. For example, the receiver may compare the post-processed SNR against the vertical lines of FIG. 8 and relay the requested mode information to the BS. The post-processed SNR values may be calculated offline and stored in memory so that the receiver does not have to perform such calculations in real-time.

Figure 9:
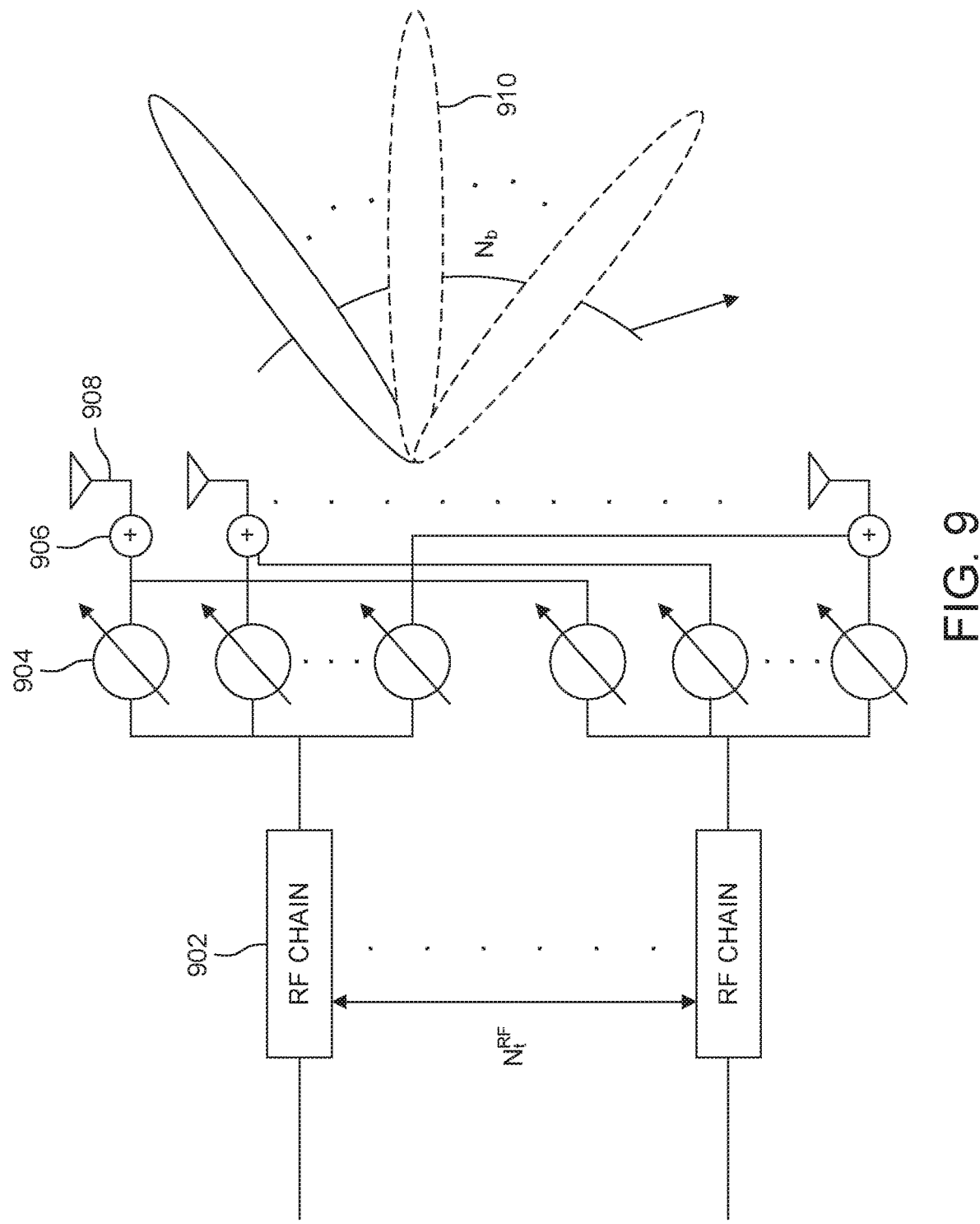
FIG. 9 is schematic illustration showing an example process for beam index modulation according to some embodiments.

FIG. 9 is schematic illustration showing an example process for beam index modulation according to some embodiments. If the number of beam-pairs 910 observed by the user that satisfy the target RSS is higher than the number of RF chains 902, the BS may use beam-index modulation with the beam-pairs reported by the user. Beam-index modulation enables communication of extra, implicit information by inferring at the receiver which specific beam was activated. FIG. 9 shows example phase shifting elements (and/or phase/gain circuits) 904, combiner circuits/elements 906, and antenna transmitters 908, configured in one embodiment to perform hybrid beamforming.

FIG. 9 illustrates the typical beam index modulation used by the BS to increase the data rate. The number of beam-pairs ($N_b$) 910 that meet the target RSS is higher than the number of RF chains ($N_{RF}$) 902. This is akin to spatial modulation, in which the antenna index carries such information. In contrast to the antenna index of spatial modulation, a learning-aided scheme may use the beam index to convey such information. Thus, the total number of bits that may be transmitted per second per channel per user is shown in Eq. 22:

$$\text{Number of Bits} = \log_2(M) + \log_2(N_b) \qquad \text{Eq. 22}$$

In addition to the beam-pairs selected for the transmission based on the input signal stream during beam index modulation, diversity or multiplexing gains also may be attained by the selected beam-pairs depending on the nature of the channel in these beam-pairs.

Simulation results for characterizing the performance are shown for several graphs. The performance of the multi-fingerprint aided beam-alignment scheme relying on learning and the benchmark are characterized. The number of vehicles at any point of time follows a Poisson distribution~Poisson($\lambda$) having both a mean and variance of X. Furthermore, the blockages caused by vehicles are random obeying the distribution $\mathcal{U}(0, N_v)$, where $N_v$ is the number of vehicles having a Poisson distribution~Poisson($\lambda$). The maximum number of blockages is assumed to be equal to the number of vehicles. Furthermore, from a database on the vehicle dimensions, the height of the vehicles follows a normal distribution with a mean of $\mu_h$ and standard deviation of $\sigma_h$. Table 3 shows the parameters used for the simulations. The neural network Used two hidden layers with 20 nodes each, while the number of nodes in the input and output layers is 3. Furthermore, the activation function chosen in each hidden layer is a Tan-Sigmoid function, while it is the softmax function in the output layer. Multi-fingerprints are used for three different traffic densities.

TABLE 3

| Simulation Parameters | |
|---|---|
| Parameter | Value |
| $P_t$ | 20 dBm |
| $N_t$ | 32 |
| $N_r$ | 8 |
| $G_t$ | 10 dBi |
| $G_r$ | 5 dBi |
| $\wedge$ (28 GHz) | 0.0107 |
| Number of Vehicles ($N_v$) | Poisson($\lambda$) |
| Vehicle Height (meters) | $\mathcal{N}$ (150, 8.6) |
| Blockages | rand (0, $N_v$) |
| $d_{user}$, $d_{obstacle}$ | rand( ) |

FIG. 10 is a graph illustrating example distribution of users at four locations according to some embodiments. FIG. 10 shows an example, where a BS 1012 is located at the center of the cell. Vehicles at location 1 (1006), vehicles at location 2 (1008), and vehicles at location 3 (1010) are shown as a normalized horizontal distance 1002 and vertical distance 1004 away the base station (BS) 1012. Furthermore, the cell is partitioned into four locations, and each location has its own fingerprints for the different traffic densities. The number of vehicles in each location is Poisson distributed, while the distance of the vehicles from the BS in each cell is uniformly distributed. Observe in FIG. 10 that the BS is serving two users 1014, 1016 in Locations 2 and 3, while the vehicles near the users are treated as obstacles.

Figure 11A:
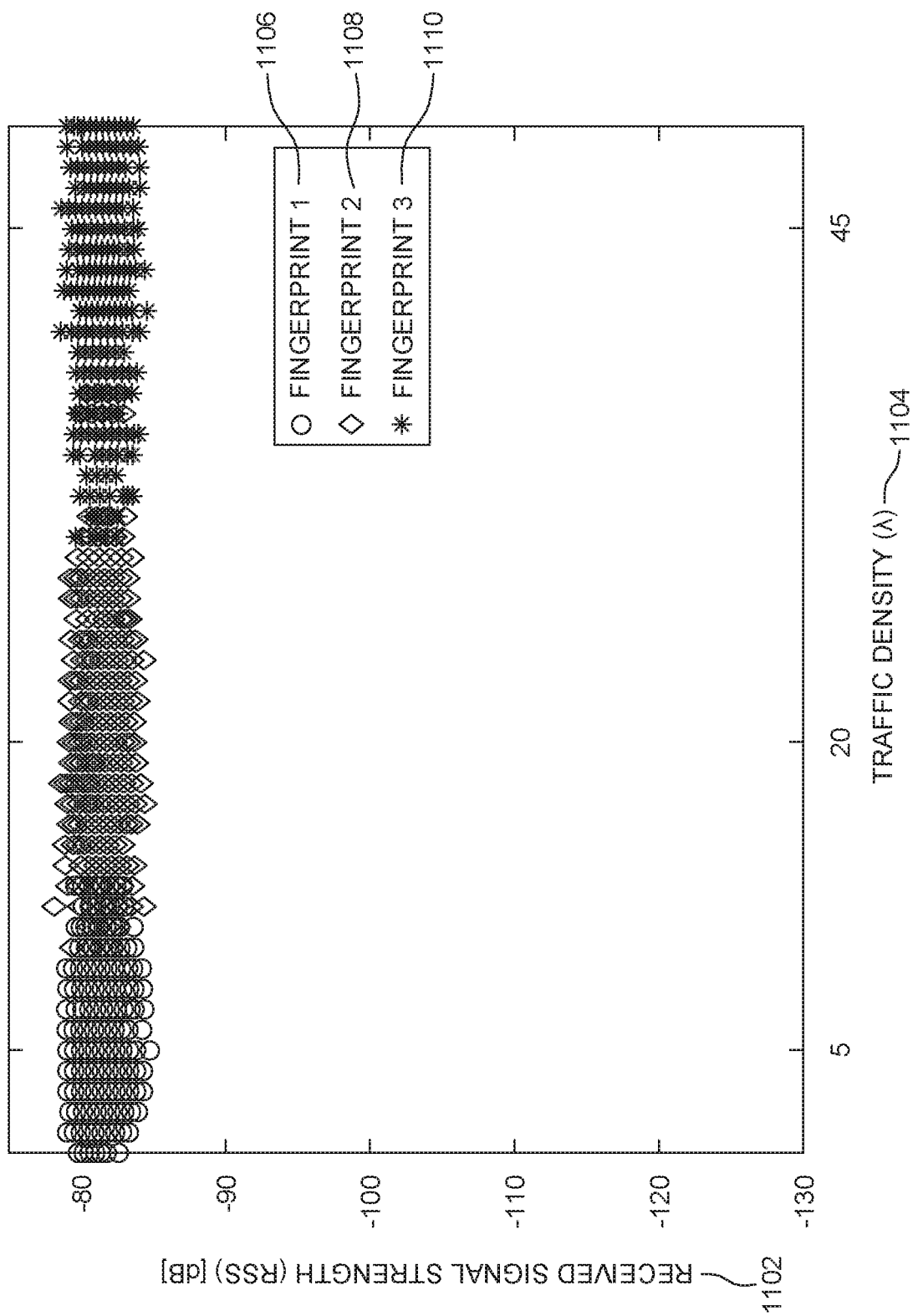
FIG. 11A is a graph illustrating a first example instantaneous RSS values for three fingerprints and three quantities of vehicles according to some embodiments.

FIG. 11A is a graph illustrating a first example instantaneous RSS values for three fingerprints and three quantities of vehicles according to some embodiments. FIG. 11A shows the instantaneous RSS values 1102 vs. traffic density ($\lambda$) 1104 for three fingerprints 1106, 1108, 1110, when the number of vehicles is Poisson distributed, as shown in FIG. 10 having means of 5, 20, and 45. FIG. 11A depicts the RSS values for the scenarios, where the difference in the height of the obstacle to the line joining the transmitter and receiver is such that v of Eq. 6 is less than −0.7, and the vehicular attenuation is zero. The attenuation of the signal is due to path loss. However, the fluctuations observed in FIG. 11A are owing to the fading introduced by the channel, which is captured in Eq. 11.

Figure 11B:
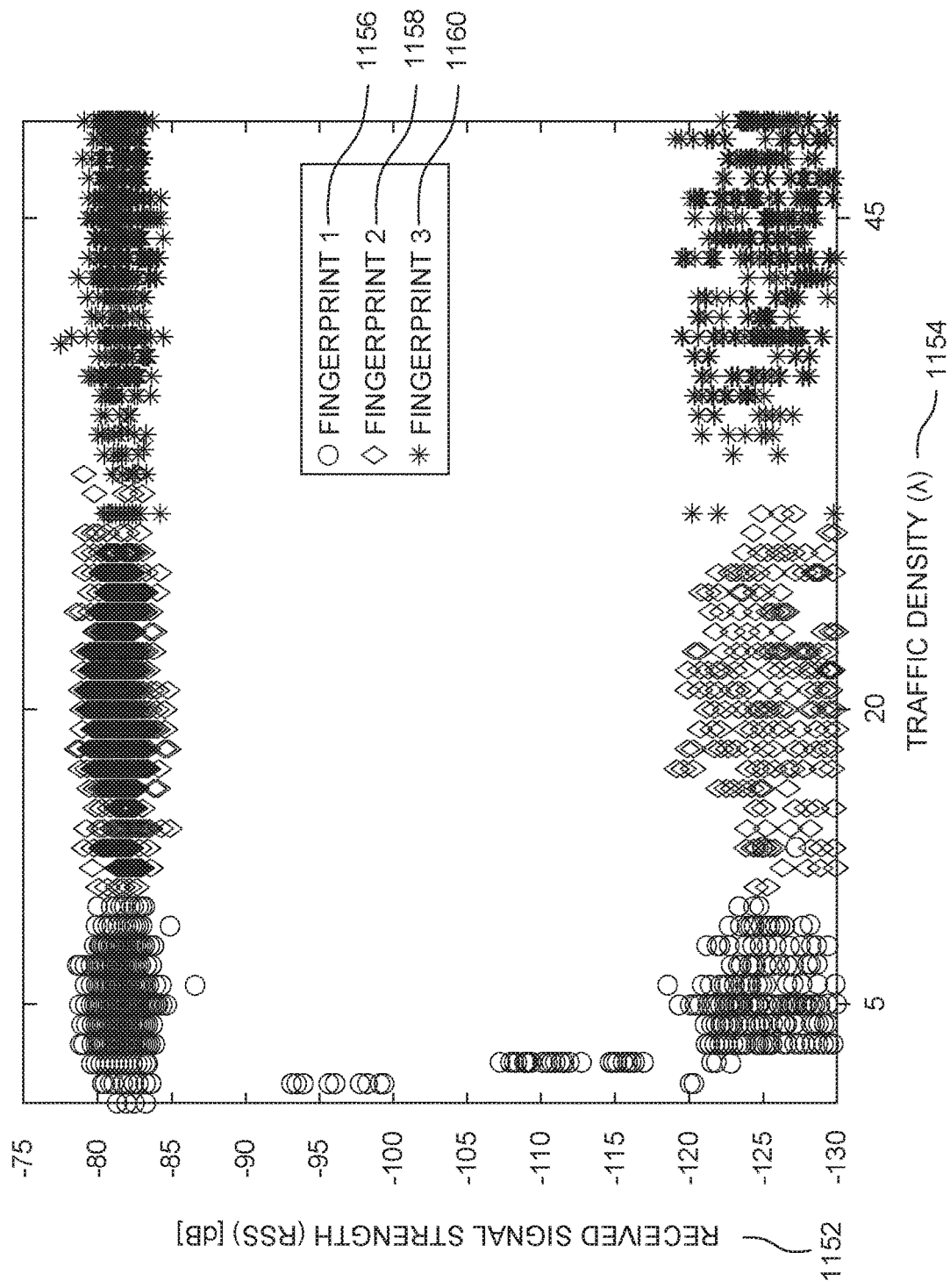
FIG. 11B is a graph illustrating a second example instantaneous RSS values for three fingerprints and three quantities of vehicles according to some embodiments.

FIG. 11B is a graph illustrating a second example instantaneous RSS values for three fingerprints and three quantities of vehicles according to some embodiments. FIG. 11B depicts the RSS values 1152 vs. traffic density ($\lambda$) 1154 for three fingerprints 1156, 1158, 1160, where the difference in the height of obstacle to the line joining the transmitter and receiver is such that v of Eq. 6 is greater than −0.7. In other words, the signal experiences attenuation due to both the vehicles and path loss, which becomes evident from the plot, where there are points scattered around having RSS values as low as −125 dB. The physical meaning of this is that some of the beam-pairs available in the fingerprints are subjected to blockages because of the vehicular obstruction. In the absence of these blockages, FIG. 11B would show similar behavior to FIG. 11A, in which both FIGS. 11A and 11B are plotted for a non-adaptive system.

Figure 12:
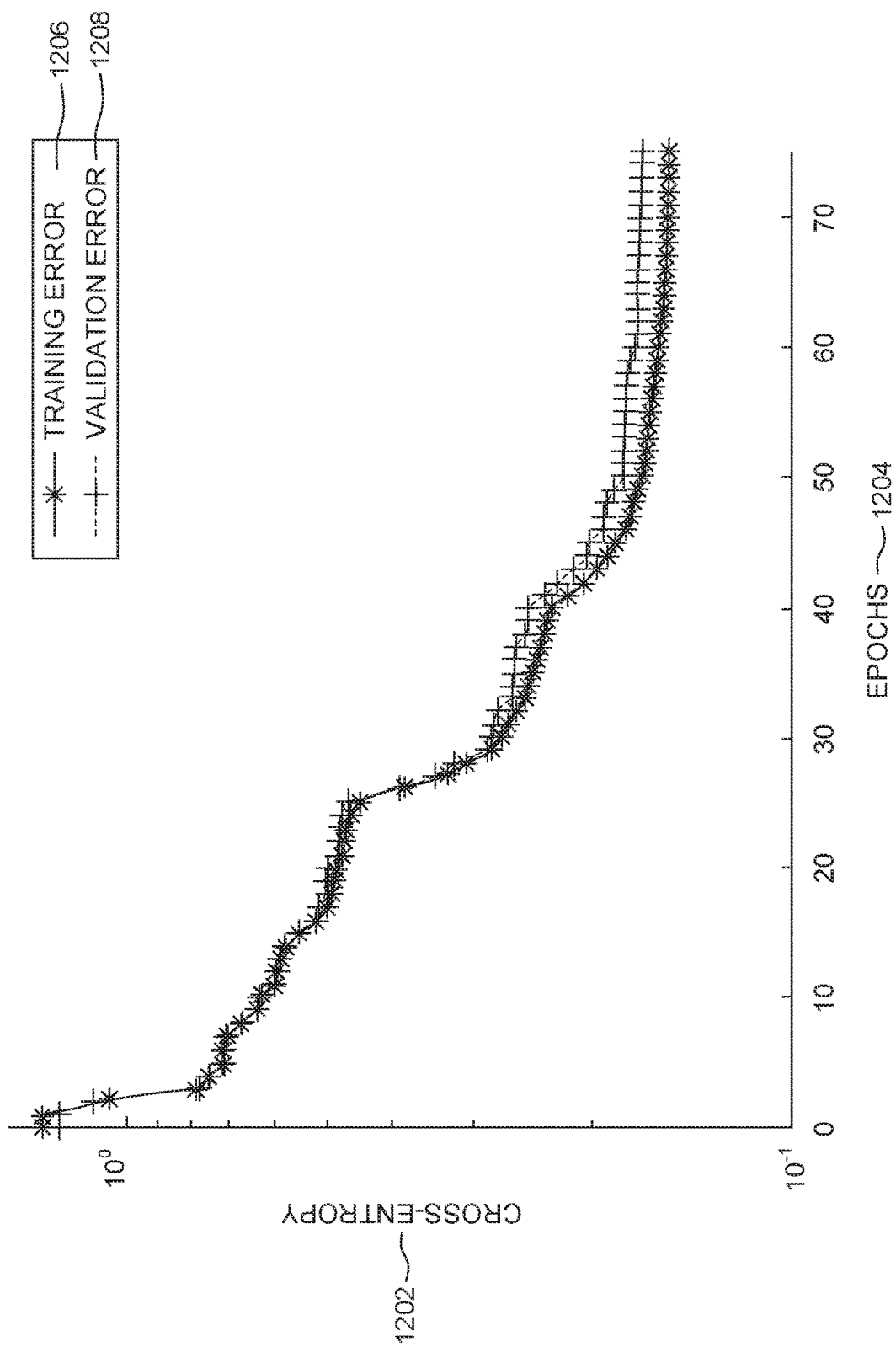
FIG. 12 is a graph illustrating example plot of cross-entropy of a network during training versus the number of epochs according to some embodiments.

FIG. 12 is a graph illustrating example plot of cross-entropy of a network during training versus the number of epochs according to some embodiments. To analyze the loss function of the softmax neural network presented in Eq. 17, FIG. 12 shows the cross-entropy 1202 of the network during training versus the number of epochs 1204. The network is said to have reached '1 Epoch' when each and every sample of the data is passed through the network for designing the network parameters for once. The epoch may be approximately equal to the number of times the dataset is used for designing the parameters. FIG. 12 shows that the network's best performance is reached after approximately 60 epochs. Furthermore, the validation error trace 1208 is only slightly higher than the training error trace 1206, which implies that the neural network weights designed are indeed capable of providing a good fit in terms of the mapping between the input and the output samples. FIG. 12 may be used to study how well the neural network parameters are designed. In other words, if the validation error in FIG. 12 is high, while the training error is low, this implies over-fitting of the network and hence the regularization parameters may be adjusted; on the other hand, if both the validation and training errors are high, this implies under-fitting and hence the number of neurons (nodes) may be adjusted.

Figure 13:
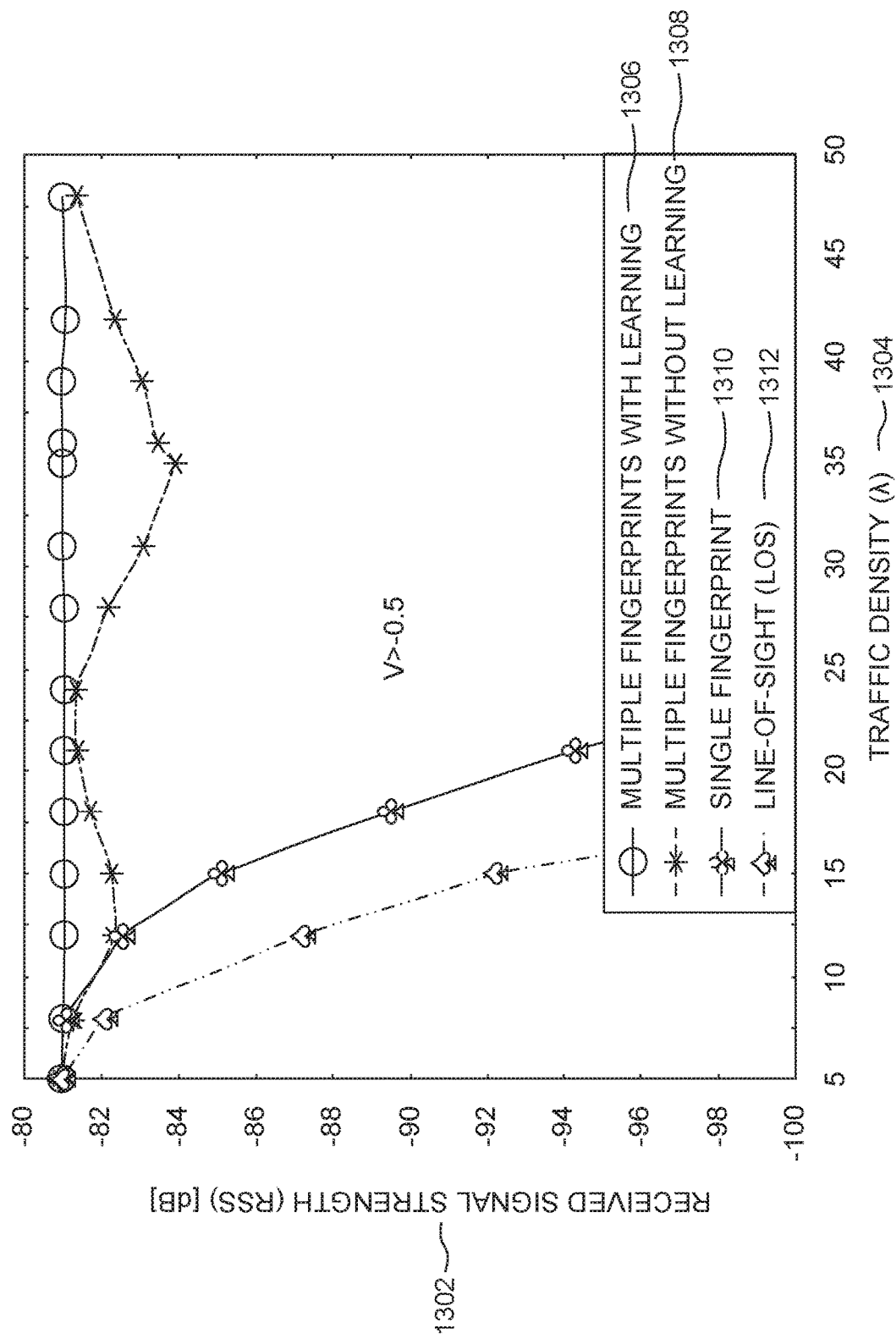
FIG. 13 is a graph illustrating examples of RSS observed for a system using multiple fingerprints both with and without learning according to some embodiments.

FIG. 13 is a graph illustrating examples of RSS observed for a system using multiple fingerprints both with and without learning according to some embodiments. FIG. 13 shows the RSS 1320 vs. traffic density ($\lambda$) 1304 for a system using multiple fingerprints both with learning 1306 and without learning 1308, for a single fingerprint 1310, and for line-of-sight (LOS) 1312 propagation. In LOS-based beam-alignment, the beam may be steered in the direction of the user, which is obtained from location, without account for blockages.

In this simulation, we have set the target RSS to −82 dBm. It is evident from FIG. 13 that multiple fingerprint-based beam-alignment provides superior performance, while the performance of single fingerprint-based beam-alignment and of line-of-sight (LOS) falls down precipitously with the increase of traffic density. This is because with the increase of traffic density, the probability of LOS blockage becomes high, hence resulting in low RSS. On the other hand, the single fingerprint-based beam-alignment, which is designed for a given traffic density and uses the same fingerprint for other traffic densities suffers from blockages, since the beam-pair suitable to one setting is unsuitable for another. In the simulations, a fingerprint for a traffic density $\lambda$ of 5 is used. Furthermore, the desired AoA-AoD pair which is suitable for that specific setting may be absent from the fingerprint constructed for another setting. Therefore, the performance is significantly affected. By contrast, the multiple fingerprint-based design provides better performance; however, it can be seen that multiple fingerprint-based adaptation without learning is unable to always maintain the target RSS. Instead it is hovering around it owing to the ever-changing channel statistics imposed by the changes in the environment. Hence, employing learning in our multiple fingerprint-based design would intelligently adapt to the time-variant environment so that it always meets the target RSS, as shown in FIG. 13.

Figure 14:
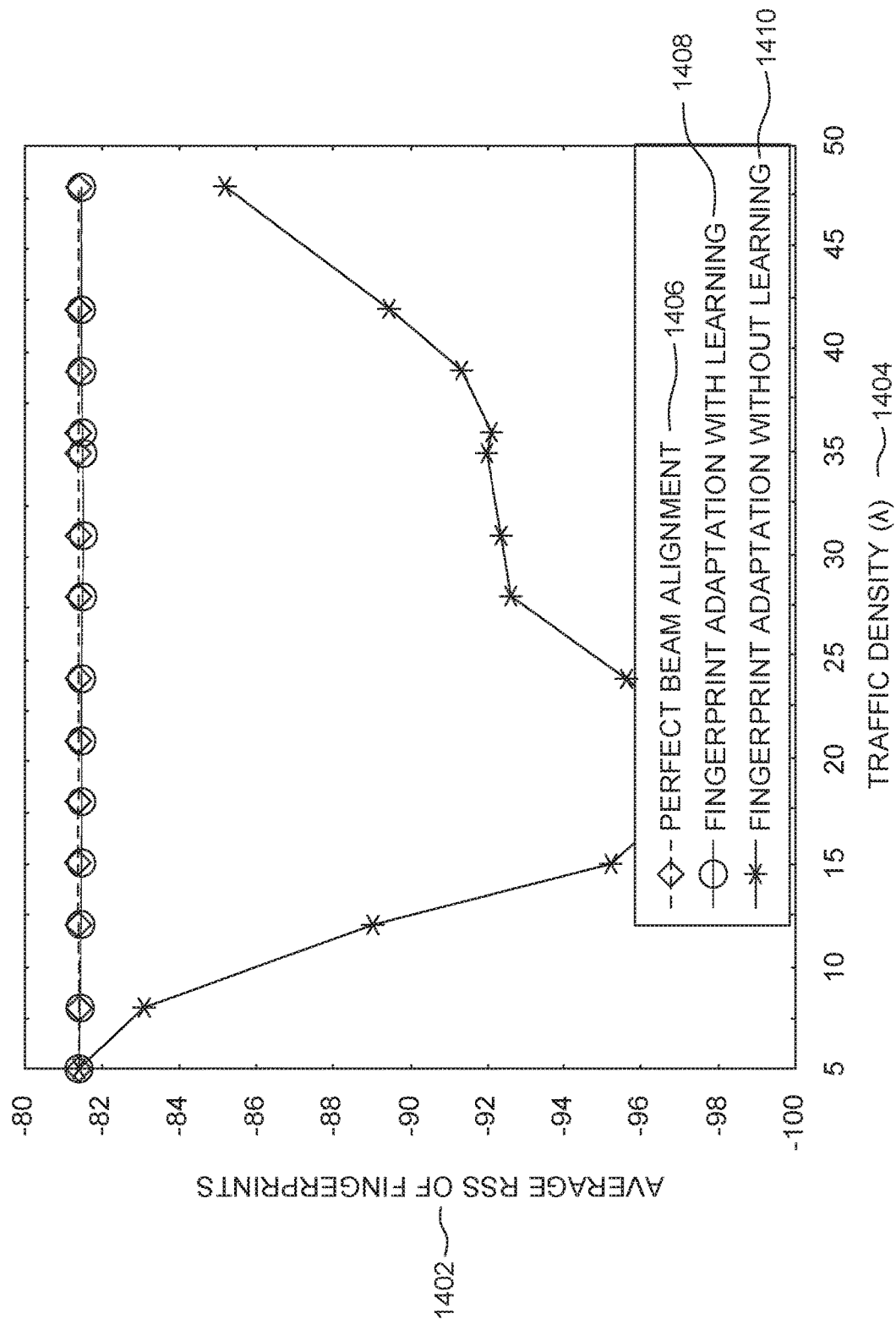
FIG. 14 is a graph illustrating example average RSS values over each beam-pair after adaptation in the selected fingerprint according to some embodiments.

FIG. 14 is a graph illustrating example average RSS values over each beam-pair after adaptation in the selected fingerprint according to some embodiments. FIG. 14 shows average RSS values of all the beam-pairs in the selected fingerprint after adaptation 1402 versus the traffic density($\lambda$) 1404. More explicitly, FIG. 14 is a measure of the total average received power observed within a given fingerprint, which is the power observed after post-processing, if the transmit power is equally shared across the beam-pairs in the fingerprint. The rationale of choosing this metric is to study the impact of the average RSS power over all the beam-pairs when the transmit power in each beam is constant. FIG. 14 shows that the fingerprint selected using learning 1408 performs similarly to perfect beam-alignment 1406, where an exhaustive beam sweeping is carried out, whereas fingerprint adaptation without learning 1410 is markedly different from perfect beam alignment 1406. The physical significance is that the receiver is able to capture the signal from all the directions predicted by our learning algorithm. In other words, the learning accurately predicted the fingerprint that is composed of maximum possible number of beam-pairs for successful link-connection, which is also observed in the average RSS. On the other hand, the fingerprint selection dispensing with the learning is significantly affected, as seen in FIG. 14, due to poor selection of the fingerprint, i.e. when the fingerprint associated with the wrong beam-pairs is selected. To elaborate further, the fingerprint that is selected does not contain the beam-pairs for successful transmission, which means that the transmit power allotted to these beam-pairs suffer blockages or experience deep fading, hence resulting in low average RSS values at the user. It is important to emphasize that our design achieves the performance of perfect beam-alignment at a significantly reduced search complexity.

Figure 15A:
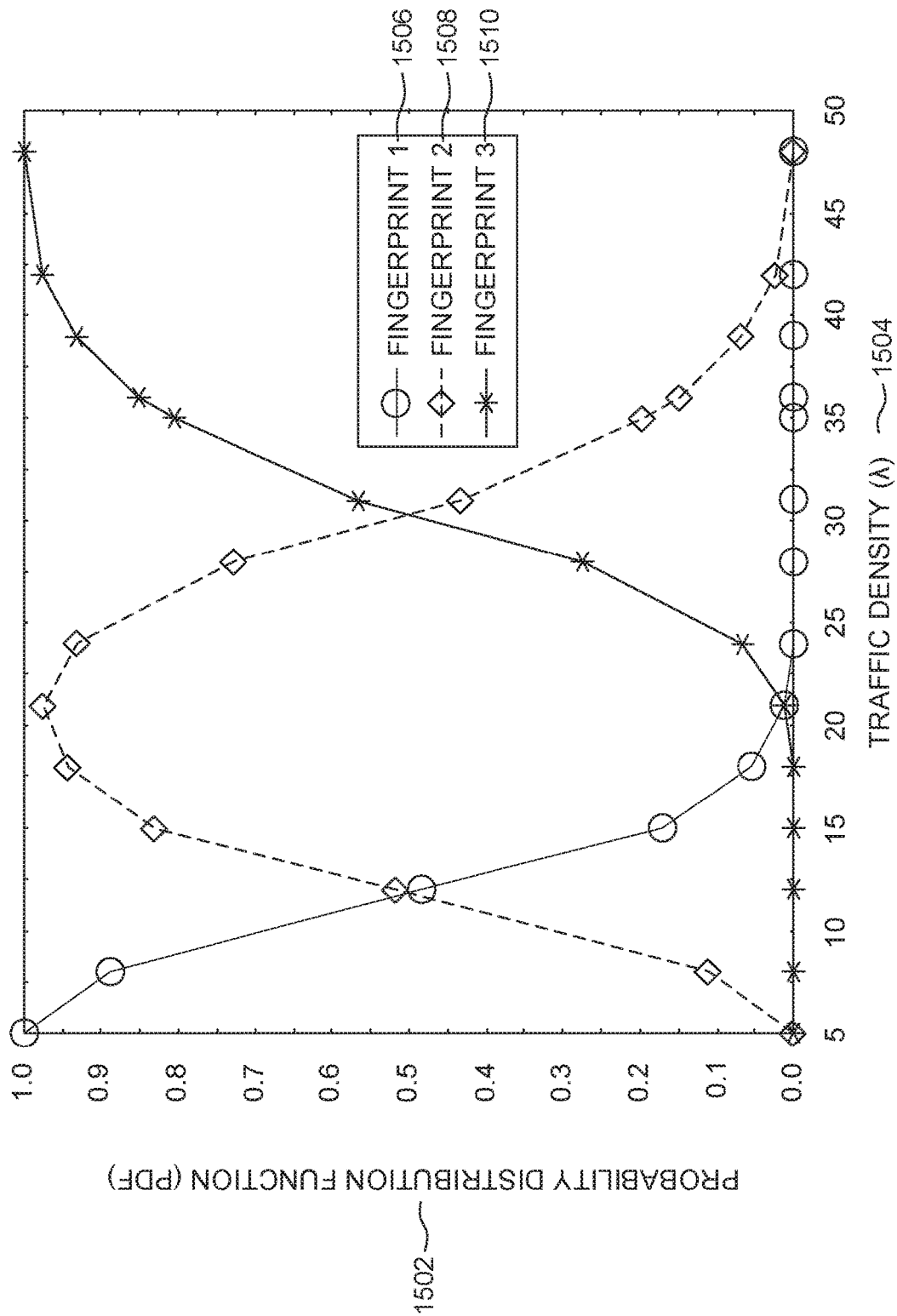
FIG. 15A is a graph illustrating example probability distribution functions of fingerprints against the traffic density according to some embodiments.
Figure 15B:
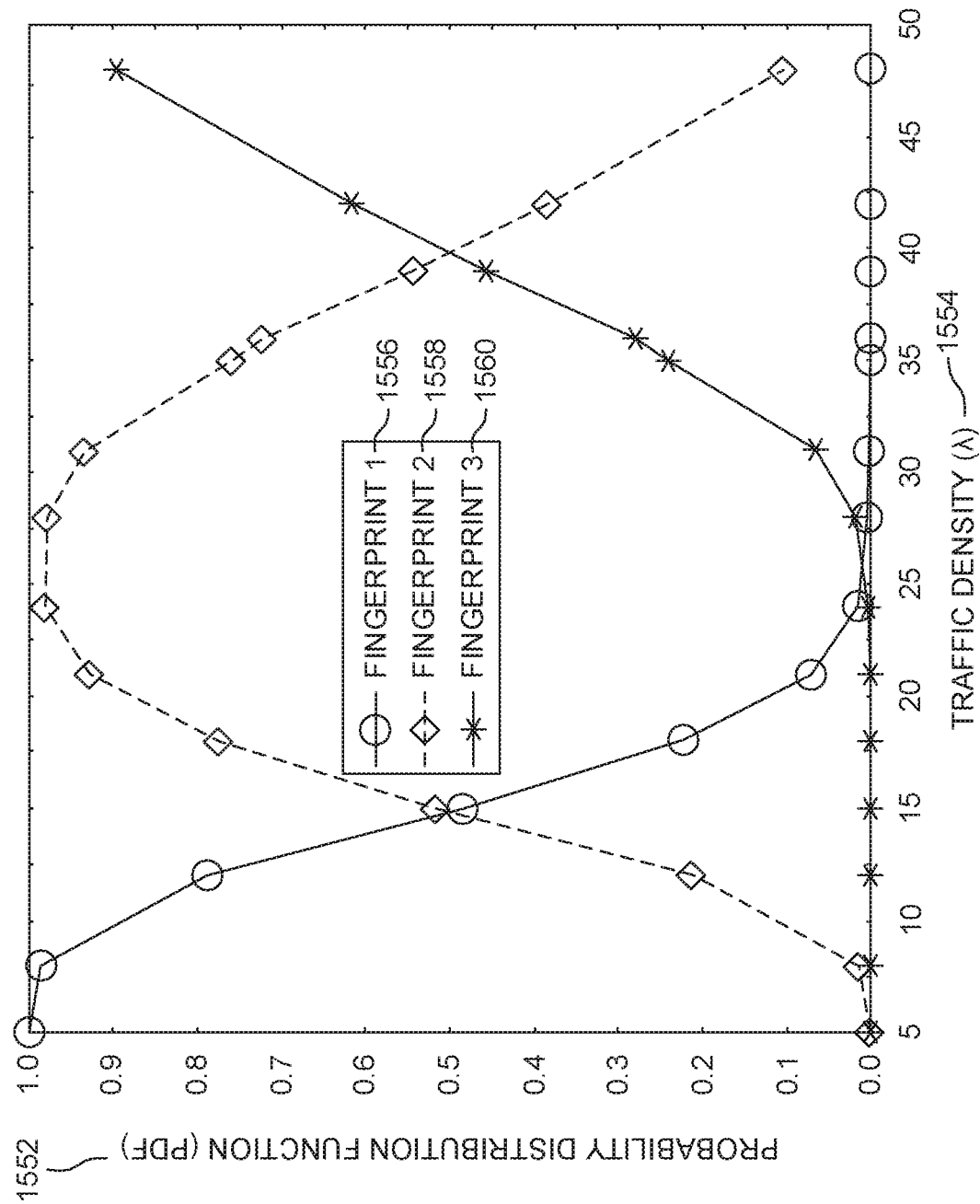
FIG. 15B is a graph illustrating example probability distribution functions of fingerprints against the traffic density according to some embodiments.

FIG. 15A is a graph illustrating example probability distribution functions of fingerprints against the traffic density according to some embodiments. FIG. 15B is a graph illustrating example probability distribution functions of fingerprints against the traffic density according to some embodiments. FIGS. 15A and 15B show the probability distribution function (PDF) 1502, 1552 of the fingerprints vs. traffic density 1504, 1554. In FIG. 15A, as the number of vehicles or as the traffic density increases, the PDF of fingerprint 1 (1506) starts falling gradually, while fingerprint 2 (1508) increases monotonically. Similarly, as the traffic density increases further, the PDF of fingerprint 2 (1508) falls and the PDF of fingerprint 3 (1510) starts to increase. This implies that the set of beam-pairs in the fingerprint that provides a successful alignment starts to fall because of the increase in blockages caused by the increase in traffic density. Hence, the fingerprint which has the beam-pairs suitable for that environment is selected for a successful transmission. For example, when considering the traffic density range between 5-to-20, the PDF of fingerprint 1 (1506) falls because, whenever the set of beams in it is blocked due to the increased density of vehicles, it selects fingerprint 2 (1508) with the aid of the learning model developed during the training phase, since it provides alternate beam-pairs for link-connection. FIG. 15B shows the PDF of the fingerprints 1556, 1158, 1560, when dispensing with learning. In FIG. 15B, switching from one fingerprint to another fingerprint is different from that observed in FIG. 15A, as the switching is decided based solely on the look-up table, which may be outdated because of the time-varying nature of the channel.

Figure 16:
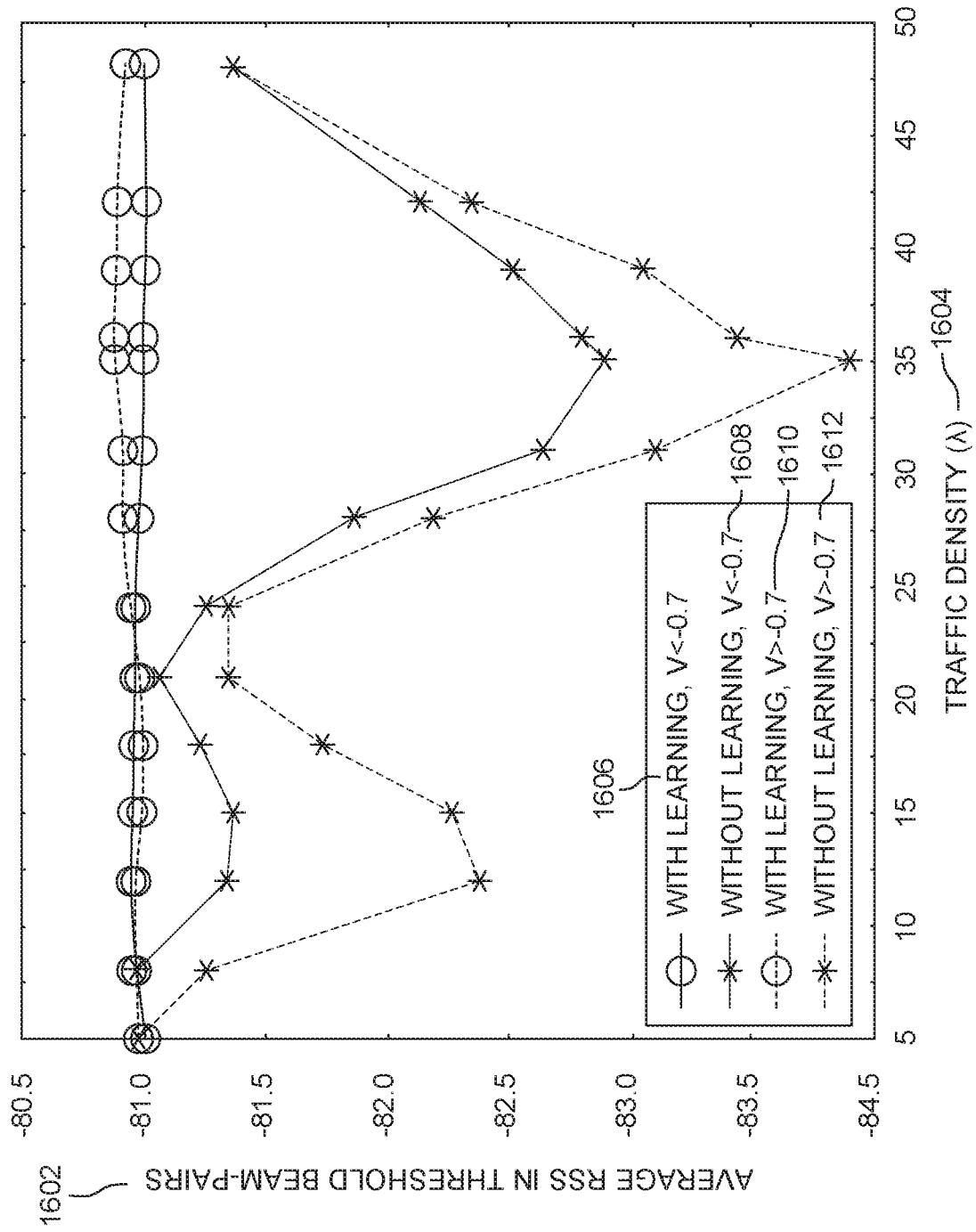
FIG. 16 is a graph illustrating example average RSS observed in the beam-pairs chosen from the selected fingerprint at the receiver according to some embodiments.

FIG. 16 is a graph illustrating example average RSS observed in the beam-pairs chosen from the selected fingerprint at the receiver according to some embodiments. The difference between FIG. 16 and FIG. 14 is that FIG. 14 is the average RSS observed in all the beam-pairs of the selected fingerprint. FIG. 16 depicts RSS 1602 vs. traffic density 1604 for two values of v (for different vehicular heights) with and without learning, resulting in four traces 1606, 1608, 1610, 1612. In this investigation, the target RSS is set to −82 dB. For both cases of v, the learning-aided design performs about 1 dB higher than the target RSS. By contrast, the design relying on look-up table suffers significantly, especially in the traffic density regions between 10-15 and 30-40. This performance is akin to that of the conventional link-adaptation designs.

Figure 17:
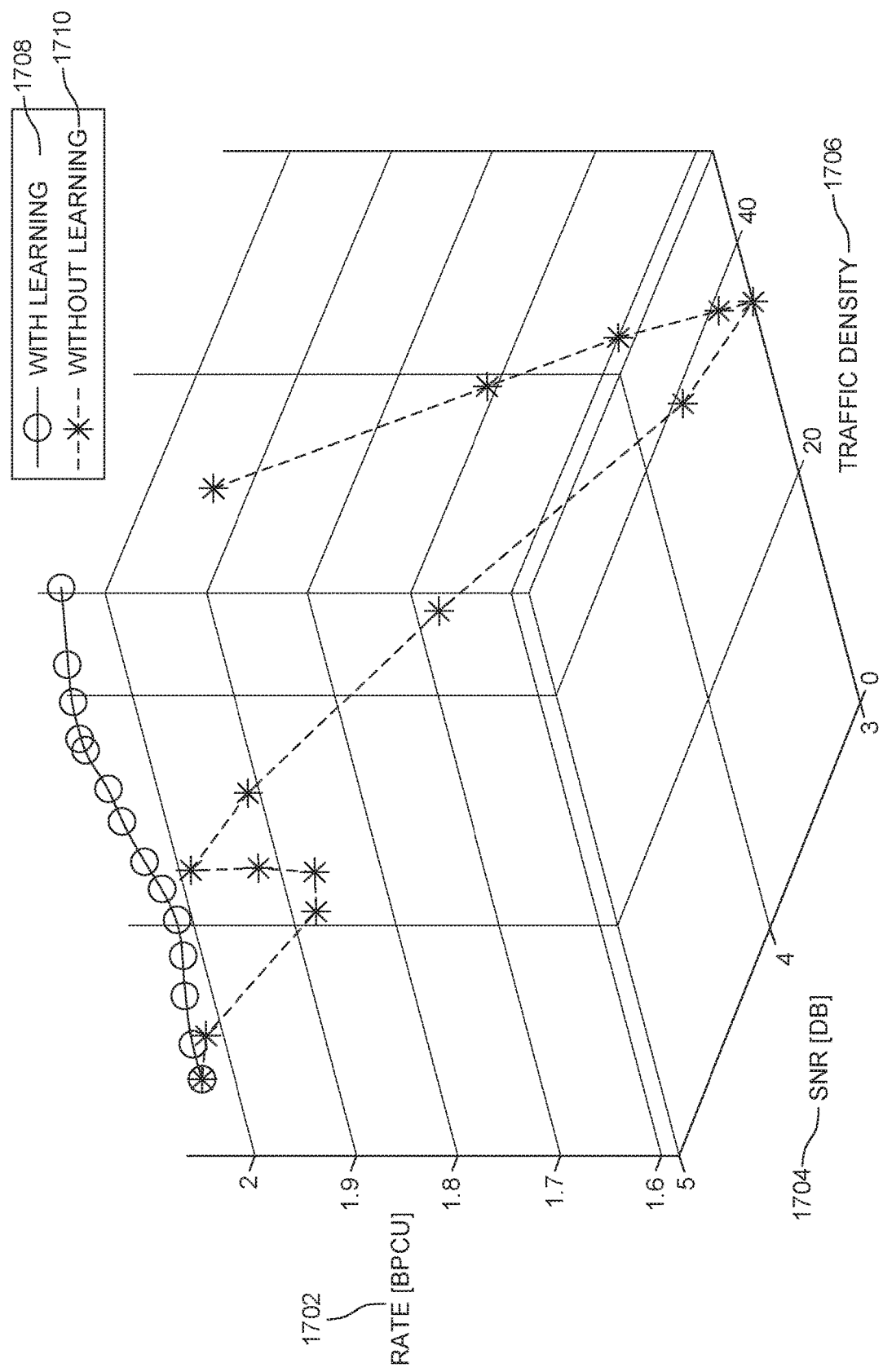
FIG. 17 is a 3D graph illustrating example relationship of traffic density, SNR, and bits per channel unit according to some embodiments.

FIG. 17 is a 3D graph illustrating example relationship of traffic density, SNR, and bits per channel unit according to some embodiments. FIG. 17 shows 3D traces of bit rate 1702, SNR 1704, and traffic density 1706 with learning 1708 and without learning 1710. As seen in FIG. 17, the rate (bpcu) 1702 without learning 1710 is inferior to that of the learning-aided beam-alignment 1708, while the design with learning 1708 provides the maximum rate of ~2 bpcu regardless of the vehicular density 1706. This is because the design without learning 1710 relies on the threshold values of the look-up table, which suffers from blockages in the traffic density regions between 10-15 and 30-40.

Complexity

In this section, we discuss the complexity of the designs presented. The conceptually simple beam-sweeping technique, imposes substantial complexity during the beam search. Let us consider a signal departing at an angle $\Theta_d \in (0,360°)$ from the transmitter, which is being received at an angle $\Theta_r \in (0,360°$ by the receiver. Assume that the half-power beam width (HPBW) of the signal ray β. Then a beam-sweeping based beam-alignment has to perform an exhaustive search over $$\left(\frac{360}{\beta}\right)^2$$

beam-pair combinations. On the other hand, the fingerprint-based beam-alignment imposes a much lower complexity, since the number of beam-pairs is significantly reduced. We note that the complexity of the proposed design predominantly arises in the learning stage, which is carried out in an offline fashion. In other words, the weights of FIG. 5B are designed prior to any communication between the BS and the user, which then are stored in memory whose storage complexity between two layers of the network is on the order of $\mathcal{O}(n_i n_j) + \mathcal{O}(n_i)$, where $n_i$ and $n_j$ are the number of neurons (or nodes) between the layers i and j, respectively. During the training phase of the neural network, a sufficient number of training samples are stored. Around 1000 training samples were used in the simulations. The training samples may be discarded once the training weights have been determined, because only the training weights are used during the testing phase.

The complexity depends on the number of computations the design performs while applying the weights in real time. To elaborate further, consider FIG. 5B, and assume that there are $n_i = n_1 = n$ neurons in each hidden layer, while the input vector $x_i$ also has a dimension of n. Then the total number of computations (additions and multiplications) used for h hidden layers is on the order of $\mathcal{O}(hn^2)$ Furthermore, the complexity of any learning algorithm depends on the input dimensionality (the input vector $x_i$ is referred to as a feature set in machine learning), which is, however, only three-dimensional in this design.

Given the ever-changing traffic density, we proposed a multi-fingerprint based database that adapts intelligently between different fingerprints with the aid of learning. Furthermore, as an extension to our proposed design, we presented an application to enhance the spectral efficiency as well as the performance by multi-functional beam transmission, where the beam-pairs that satisfy the required received signal strength participate in increasing the spectral efficiency. Having a multiple fingerprint-based beam-alignment may provide superior performance over the single fingerprint based beam-alignment. Furthermore, we showed that our learning-aided multiple fingerprint design provides better fidelity than that of the scheme employing multiple fingerprints but dispensing with learning. Additionally, our proposed learning-aided beam-alignment design performs similarly to that of beam-sweeping based beam-alignment where an exhaustive beam search is carried out, at a reduced search complexity. More explicitly, our design is capable of maintaining the target RSS in dense vehicular environments, while both single fingerprint and line-of-sight (LOS) based beam-alignment suffer from blockages.

Figure 18:
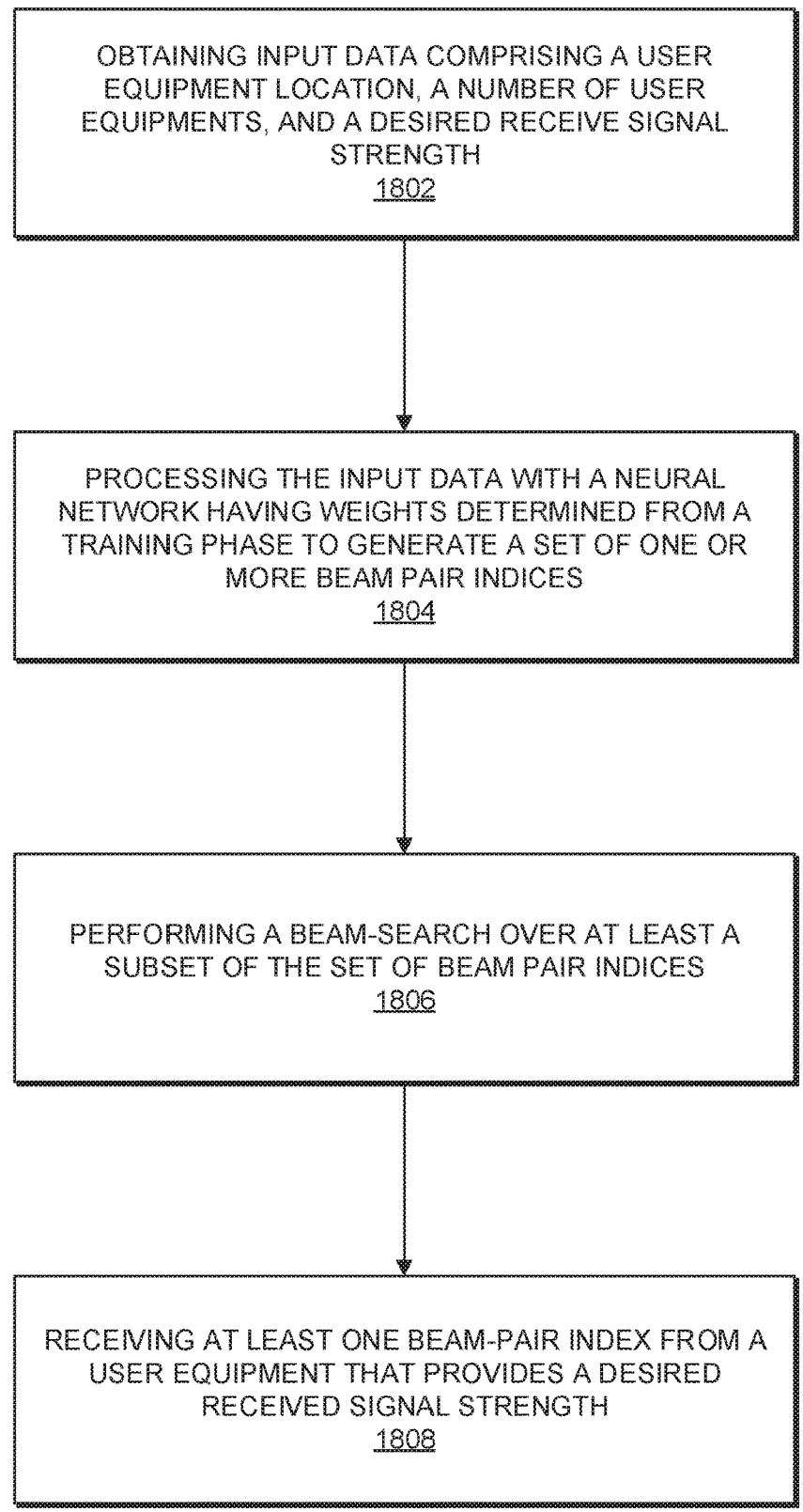
FIG. 18 is a flowchart illustrating an example process for determining beam-pairs providing a desired RSS according to some embodiments.

FIG. 18 is a flowchart illustrating an example process for determining beam-pairs providing a desired RSS according to some embodiments. For some embodiments, an example process 1800 may include obtaining 1802 input data comprising a user equipment location, a number of user equipments, and a desired receive signal strength. For some embodiments, the example process 1800 may further include processing 1804 the input data with a neural network having weights determined from a training phase to generate a set of one or more beam-pair indices. For some embodiments, the example process 1800 may further include performing 1806 a beam search over at least a subset of the set of beam-pair indices. For some embodiments, the example process 1800 may further include receiving 1808 at least one beam-pair index from a user equipment that provides a desired received signal strength (RSS).

An example method in accordance with some embodiments may include: obtaining input data comprising a user equipment location, a number of user equipments, and a desired receive signal strength; processing the input data with a neural network having weights determined from a training phase to generate a set of one or more beam-pair indices; performing a beam search over at least a subset of the set of beam-pair indices; and receiving at least one beam-pair index from a user equipment that provides a desired received signal strength.

For some embodiments of the example method, the user equipment location may be conveyed to a base station from a user equipment using an out of band signaling channel.

For some embodiments of the example method, the number of user equipments may be known to a base station according to a vehicular density.

For some embodiments of the example method, the set of one or more beam-pair indices may be further generated using a softmax algorithm.

For some embodiments of the example method, the softmax algorithm may generate probabilities associated with sets of beam-pair indices.

For some embodiments of the example method, the set of one or more beam-pair indices may be stored in a database during a training phase.

For some embodiments of the example method, the training phase may include: obtaining training samples for each training location; initializing weight vectors as random values; and iteratively performing the following steps until a convergence metric threshold is reached: computing neuron outputs for each layer using the respective weight vector; applying a softmax function to obtain class probabilities; calculating weight matrices and bias vectors; and performing error backpropagation.

An additional example method in accordance with some embodiments may include: obtaining location information from a user equipment based on an initial network access process; using a neural network to process the location information to generate a fingerprint output having an associated set of beam-pairs; and conduct beam training using the set of beam-pairs.

Some embodiments of the additional example method may further include informing a user equipment of candidate beam-pairs based on the set of beam-pairs.

For some embodiments of the additional example method, the candidate beam-pairs may be a subset of the associated beam-pairs.

An example method/apparatus in accordance with some embodiments may include: at a base station, adapting location-specific beam-pair fingerprints to a traffic condition; and using the beam-pair fingerprints to conduct beam training.

An example method in accordance with some embodiments may include: obtaining input data comprising a user equipment location, a number of user equipments (UEs), and a desired receive signal strength; processing the input data with a neural network having weights determined from a training phase to generate a set of one or more beam-pair indices; performing a beam search over at least a subset of the set of beam-pair indices; and receiving at least one beam-pair index from a user equipment that provides the desired received signal strength.

For some embodiments of the example method, the user equipment location may be conveyed to a base station from a user equipment using an out of band signaling channel.

For some embodiments of the example method, the number of UEs may be known to a base station according to a vehicular density.

For some embodiments of the example method, the set of one or more beam-pair indices may be further generated using a softmax algorithm.

For some embodiments of the example method, the softmax algorithm may generate probabilities associated with sets of beam-pair indices.

For some embodiments of the example method, the set of one or more beam-pair indices may be stored in a database during a training phase.

For some embodiments of the example method, the training phase may include: obtaining training samples for each training location; initializing weight vectors as random values; and iteratively performing the following steps until a convergence metric threshold is reached: computing neuron outputs for each layer using the respective weight vector; applying a softmax function to obtain class probabilities; calculating weight matrices and bias vectors; and performing error backpropagation.

For some embodiments of the example method, processing the input data with the neural network may include: obtaining a plurality of fingerprints for different traffic conditions at the user equipment location; and using the neural network coupled with a softmax classifier to select one of the plurality of fingerprints based on traffic conditions at the user equipment location, wherein selecting one of the plurality of fingerprints may generate the set of one of more beam-pair indices, and using the neural network may use the weights determined from the training phase.

For some embodiments of the example method, the traffic conditions may include the number of UEs at the user equipment location.

For some embodiments of the example method, the neural network may be a deep learning feedforward neural network.

For some embodiments of the example method, performing the beam search may include: sending, to the user equipment, fingerprint information comprising the set of one or more beam-pair indices; and performing a beam training process over at least the subset of the set of beam-pair indices to select from the set of one or more beam-pair indices a selected beam-pair which meets the desired receive signal strength.

Some embodiments of the example method may further include: obtaining training samples for at least one training location; initializing weight vectors as random values; and iteratively performing the following steps until a convergence metric threshold is reached: computing neuron outputs for at least one layer of the neural network using the respective weight vector; applying a softmax function to an output layer of the neural network to obtain class probabilities; updating weight matrices and bias vectors; and performing error backpropagation.

Some embodiments of the example method may further include determining a loss function between a predicted class probability and a true class probability, wherein the convergence metric threshold is reached if the loss function is less than the convergence metric threshold.

Some embodiments of the example method may further include selecting at least one beam-pair index from the set of beam-pair indices to use to transmit data to a receiver.

For some embodiments of the example method, selecting the at least one beam-pair index may include using a multi-functional beam transmission scheme.

For some embodiments of the example method, selecting the at least one beam-pair index may be repeated periodically.

For some embodiments of the example method, selecting the at least one beam-pair index may be performed upon a triggering event, and the triggering event may be detecting a change in a parameter of the user equipment.

An example apparatus in accordance with some embodiments may include: a processor; and a non-transitory computer-readable medium storing instructions operative, when executed by the processor, to perform any one of the embodiments of the example method.

An additional example method in accordance with some embodiments may include: obtaining location information from a user equipment based on an initial network access process; using a neural network to process the location information to generate a fingerprint output having an associated set of beam-pairs; and conducting beam training using the set of beam-pairs.

Some embodiments of the additional example method may further include informing a user equipment of candidate beam-pairs based on the set of beam-pairs.

For some embodiments of the additional example method, the candidate beam-pairs may be a subset of the associated beam-pairs.

An additional example apparatus in accordance with some embodiments may include a processor; and a non-transitory computer-readable medium storing instructions operative, when executed by the processor, to perform any one of the embodiments of the additional example method.

A further example method in accordance with some embodiments may include: adapting, at a base station, location-specific beam-pair fingerprints to a traffic condition; and using the beam-pair fingerprints to conduct beam training.

A further example apparatus in accordance with some embodiments may include: a processor; and a non-transitory computer-readable medium storing instructions operative, when executed by the processor, to: adapt, at a base station, location-specific beam-pair fingerprints to a traffic condition; and use the beam-pair fingerprints to conduct beam training.

A further additional example method in accordance with some embodiments may include: obtaining input data comprising a user equipment (UE) location, a traffic density of UEs, and received signal strength (RSS) threshold; processing the information for the user equipment with a neural network having weights determined from a training phase to generate a set of one or more beam-pair indices; communicating to the user equipment the set of one or more beam-pair indices; communicating to the user equipment an indication to conduct beam training using the set of one or more beam-pair indices; and receiving at least one beam-pair index from the user equipment that meets the RSS threshold.

A further additional example apparatus in accordance with some embodiments may include: a processor; and a non-transitory computer-readable medium storing instructions operative, when executed by the processor, to: obtain input data comprising a user equipment (UE) location, a traffic density of UEs, and received signal strength (RSS) threshold; process the information for the user equipment with a neural network having weights determined from a training phase to generate a set of one or more beam-pair indices; communicate to the user equipment the set of one or more beam-pair indices; communicate to the user equipment an indication to conduct beam training using the set of one or more beam-pair indices; and receive at least one beam-pair index from the user equipment that meets the RSS threshold.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A method implemented by a network node, the method comprising:
    obtaining input data comprising a wireless transmit/receive unit (WTRU) location, a number of WTRU, and a desired received signal strength;
    processing the input data with a trained neural network to generate a set of one or more beam-pairs, wherein each beam-pair is associated with the WTRU location, the number of WTRUs, and the desired received signal strength;
    transmitting, to a WTRU, information indicating one more candidate beam-pairs, wherein the one of more candidate beam-pairs are based on the generated set of beam-pairs;
    transmitting, for at least one candidate beam-pair of the one or more candidate beam-pairs, a signal using a it beam of the at least one candidate beam-pair, and
    receiving, from the WTRU, information indicating at least one suitable candidate beam-pair from the one or more candidate beam-pairs, wherein the at least one suitable candidate beam-pair provides the desired received signal strength.

2. The method of claim 1, wherein the WTRU location is received from the WTRU based on an initial network access process.

3. The method of claim 1, wherein the number of WTRUS is known to the network node according to a vehicular density.

4. The method of claim 1, wherein the generated set of one or more beam-pairs is generated using a softmax algorithm.

5. The method of claim 4, wherein the softmax algorithm generates probabilities associated with sets of beam-pairs.

6. The method of claim 1, wherein the generated set of one or more beam-pairs is stored in a database during a training phase.

7. The method of claim 6, wherein the trained neural network uses weights determined from the training phase, and wherein the training phase comprises:
    obtaining training samples for each training location;
    initializing weight vectors as random values; and
    iteratively performing the following steps until a convergence metric threshold is reached:
        computing neuron outputs for each layer using the respective weight vector;
        applying a softmax function to obtain class probabilities;
        calculating weight matrices and bias vectors; and
        performing error backpropagation.

8. The method of claim 1, wherein processing the input data with the trained neural network comprises:
    obtaining a plurality of sets of one of more beam-pairs for different vehicular densities at the WTRU location; and
    using the trained neural network coupled with a softmax classifier to generate the set of one of more beam-pairs from the plurality of sets of one of more beam-pairs based on the vehicular densities at the WTRU location, wherein using the trained neural network uses the weights determined from a training phase.

9. The method of claim 8, wherein the vehicular densities comprise the number of WTRUs at the WTRU location.

10. The method of claim 8, wherein the trained neural network is a deep learning feedforward neural network.

11. The method of claim 1, wherein the trained neural network uses weights determined from a training phase, the method further comprising:
    obtaining training samples for at least one training location;
    initializing weight vectors as random values; and
    iteratively performing the following steps until a convergence metric threshold is reached:

computing neuron outputs for at least one layer of the trained neural network using the respective weight vector;

applying a softmax function to an output layer of the trained neural network to obtain class probabilities;

updating weight matrices and bias vectors; and performing error backpropagation.

12. The method of claim 11, further comprising:
determining a loss function between a predicted class probability and a true class probability, wherein the convergence metric threshold is reached if the loss function is less than the convergence metric threshold.

13. The method of claim 1, further comprising:
selecting the at least one suitable candidate beam-pair to transmit data to a receiver.

14. The method of claim 13, wherein selecting the at least one suitable candidate beam-pair comprises using a multi-functional beam transmission scheme.

15. The method of claim 13, wherein selecting the at least one suitable candidate beam-pair is repeated periodically.

16. The method of claim 13, wherein selecting the at least one suitable candidate beam-pair is performed upon detection of a triggering event, wherein the triggering event is a change in a parameter of the WTRU.

17. The method of claim 1, wherein the network node is a base station.

18. A network node comprising:
a processor; and
a non-transitory computer-readable medium storing instructions operative, when executed by the processor, to:
  obtain input data comprising a wireless transmit/receive unit (WTRU) location, a number of WTRUs, and a desired received signal strength;
  process the input data with a trained neural network to generate a set of one or more beam-pairs, wherein each beam-pair is associated with the WTRU location, the number of WTRUs, and the desired received signal strength;
  transmitting, to a WTRU, information indicating one or more candidate beam-pairs, wherein the one or more candidate beam-pairs are based on the generated set of beam-pairs;
  transmit, for at least one candidate beam-pair of the one or more candidate beam-pairs, a signal using a transmit beam of the at least one candidate beam-pair; and
  receive, from the WTRU, information indicating at least one suitable candidate beam-pair from the one or more candidate beam-pairs, wherein the at least one suitable candidate beam-pair provides the desired received signal strength.

* * * * *